(12) United States Patent
Vaswani et al.

(10) Patent No.: US 9,887,893 B2
(45) Date of Patent: *Feb. 6, 2018

(54) SYSTEM, METHOD AND PROGRAM FOR DETECTING ANOMALOUS EVENTS IN A NETWORK

(71) Applicant: Silver Spring Networks, Inc., San Jose, CA (US)

(72) Inventors: Raj Vaswani, Portola Valley, CA (US); Jana van Greunen, San Jose, CA (US); Aditi Dubey, Redwood City, CA (US); Kunal Pankaj Shah, San Jose, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,928

(22) Filed: Feb. 20, 2017

(65) Prior Publication Data

US 2017/0163508 A1  Jun. 8, 2017

Related U.S. Application Data

(63) Continuation of application No. 14/593,288, filed on Jan. 9, 2015, now Pat. No. 9,608,887, which is a
(Continued)

(51) Int. Cl.
*G06F 13/00* (2006.01)
*H04L 12/26* (2006.01)
*G01D 4/00* (2006.01)
*H04W 84/18* (2009.01)

(52) U.S. Cl.
CPC ......... *H04L 43/0817* (2013.01); *G01D 4/004* (2013.01); *H04W 84/18* (2013.01)

(58) Field of Classification Search
CPC ... H04W 84/18; G01D 4/004; H04L 43/0817; H04L 43/16; Y02B 90/242; Y02B 90/246; Y02B 20/322; Y02B 20/36; Y02B 20/42
(Continued)

(56) References Cited

U.S. PATENT DOCUMENTS

| | | | |
|---|---|---|---|
| 5,574,653 | A | 11/1996 | Coomer et al. |
| 5,940,009 | A | 8/1999 | Loy et al. |

(Continued)

FOREIGN PATENT DOCUMENTS

| | | |
|---|---|---|
| EP | 0629098 B1 | 12/2001 |
| WO | 95/24623 A1 | 9/1995 |
| WO | 03/065055 A2 | 8/2003 |

OTHER PUBLICATIONS

International Search Report and Written Opinion dated Mar. 19, 2012 issued in corresponding International Appln. No. PCT/US2011/001374 (10 pages).
(Continued)

*Primary Examiner* — Kenneth R Coulter
(74) *Attorney, Agent, or Firm* — Buchanan Ingersoll & Rooney PC

(57) ABSTRACT

A communication device detects whether anomalous events occur with respect to at least one node in a utility network. The communication device has recorded therein threshold operating information and situational operating information. The threshold operating information includes data indicative of configured acceptable operating parameters of nodes in the network based on respective locational information of the nodes. The situational information includes data indicative of configured operation data expected to be received from nodes in the network during a predetermined time period, based on a condition and/or event occurring during the time period. The communication device receives operation data from nodes in the network, and determines whether
(Continued)

the operation data from a node constitutes an anomalous event based on a comparison of the received operation data with (i) the threshold operating information defined for the node and (ii) the situational information. The communication device outputs notification of any determined anomalous event.

23 Claims, 10 Drawing Sheets

Related U.S. Application Data continuation of application No. 13/862,985, filed on Apr. 15, 2013, now Pat. No. 8,966,069, which is a continuation of application No. 12/851,830, filed on Aug. 6, 2010, now Pat. No. 8,423,637.

(58) Field of Classification Search
USPC ......... 709/224, 223; 714/43, 44, 25; 702/51, 702/57–62, 64, 65
See application file for complete search history.

(56) References Cited

U.S. PATENT DOCUMENTS

| | | |
|---|---|---|
| 6,100,816 A | 8/2000 | Moore |
| 6,538,577 B1 | 3/2003 | Ehrke et al. |
| 6,584,419 B1 | 6/2003 | Alexander |
| 6,735,630 B1 | 5/2004 | Gelvin et al. |
| 7,920,983 B1 | 4/2011 | Peleg et al. |
| 7,962,101 B2 | 6/2011 | Vaswani et al. |
| 8,423,637 B2 | 4/2013 | Vaswani et al. |
| 8,693,580 B2* | 4/2014 | McHann, Jr. ......... H02J 13/002 375/316 |
| 8,966,069 B2 | 2/2015 | Vaswani et al. |
| 9,608,887 B2* | 3/2017 | Vaswani ................ G01D 4/004 |
| 2008/0294452 A1 | 11/2008 | Hunt |
| 2009/0045976 A1 | 2/2009 | Zoldi et al. |
| 2010/0152910 A1 | 6/2010 | Taft |
| 2011/0215945 A1 | 9/2011 | Peleg et al. |
| 2011/0288777 A1 | 11/2011 | Gupta |
| 2013/0030761 A1* | 1/2013 | Lakshminarayan . G06K 9/6219 702/179 |
| 2014/0215064 A1* | 7/2014 | McHann, Jr. ......... H02J 13/002 709/224 |

OTHER PUBLICATIONS

International Search Report and Written Opinion dated Nov. 11, 2011 issued in corresponding International Appln. No. PCT/US2010/003003 (19 pages).

Partial Search Report dated Aug. 23, 2011 issued corresponding International Appln. No. PCT/US2010/003003 (8 pages).

* cited by examiner

SYSTEM, METHOD AND PROGRAM FOR DETECTING ANOMALOUS EVENTS IN A NETWORK

RELATED APPLICATION

This application is a continuation of U.S. application Ser. No. 14/593,288, filed Jan. 9, 2015, now U.S. Pat. No. 9,608,887, which is a continuation of U.S. application Ser. No. 13/862,985, now U.S. Pat. No. 8,966,069, filed Apr. 15, 2013, which is a continuation of U.S. application Ser. No. 12/851,830, now U.S. Pat. No. 8,423,637, filed Aug. 6, 2010, the entire contents of which are hereby incorporated by reference in their entireties.

FIELD OF THE DISCLOSURE

The present disclosure relates generally to a system, device, method and computer program for detecting anomalous events in the operation of a network, such as a utility network.

BACKGROUND

Although not limited thereto, one application of the concepts described in this disclosure is in the context of a utility network. Automated Meter Reading (AMR) systems, including handheld, mobile and network technologies for automatically collecting data from utility meters, efficiently and accurately collect metering data, as compared to manual meter reading. Advanced Metering Infrastructure (AMI) networks employing AMR technology collect additional types of data, such as interval data or logging of meter events. The additional data is used for a variety of purposes, e.g., usage profiling, time of use billing, demand forecasting, demand response, rate of flow recording, leak detection, flow monitoring, conservation enforcement, and remote shutoff.

In an AMR/AMI network, the utility meters are fully electronic with data reading, data storing, and digital packet communications capabilities. The utility meters are all linked together in a wireless LAN (local area network) configuration. In this configuration, each utility meter is a network node. Each node can communicate with other nodes directly and with a communication station of the utility provider via an access point. Some nodes may be able to communicate with more than one access point. The access points act as a gateway for the nodes in the wireless network, and transfer messages between themselves, other nodes and the communication station of the utility provider. Similarly, the communication station of the utility provider can communicate with the nodes in the wireless LAN via the access points. Access points can be passive bridges or active data routers/forwarders, depending on the type of network devices deployed and the applications. An example of an AMR/AMI network and a technique of connecting nodes thereto is found in co-pending U.S. application Ser. No. 11/732,964, now U.S. Pat. No. 7,962,101, which is incorporated herein by reference in its entirety.

The introduction of an AMR/AMI network has facilitated communications between utility meters and a communication station of a utility provider, particularly with collecting usage data at the meters and reporting the collected usage data to the communication station of the utility provider. In addition, an AMR/AMI network can facilitate implementation of network management at the communication station of the utility provider, such as monitoring distribution of a commodity across the utility network, load detection and management at nodes in the utility network, and remote connection and disconnection. Anomalous events can occur in connection with the operation of the utility network. The anomalous events can be intentionally created by a utility consumer, such as by manipulating the operation of a utility meter, or occur accidentally, such as in connection with a power outage over a portion of the utility network. Detecting anomalous events in the utility network contemporaneously with the occurrence of such events can facilitate improved management and operation of the utility network.

SUMMARY

An exemplary embodiment provides a utility network communication device configured to detect anomalous events occurring in connection with at least one node in a utility network. The exemplary communication device includes a memory unit having threshold operating information and situational information defined and recorded therein. The threshold operating information includes data indicative of configured acceptable operating parameters of nodes in the utility network based on respective locational information of the nodes in the utility network. The situational information includes data indicative of configured operation data expected to be received from nodes in the utility network during a predetermined time period based on at least one of a condition and an event that is occurring during the predetermined time period. The exemplary communication device also includes a communication unit configured to receive operation data from nodes in the utility network, and a control unit. The control unit is configured to compare the operation data received from a node in the utility network with (i) the threshold operating information defined for the node from which the operation data was received and (ii) the situational information, and to determine whether the operation data received from the node constitutes an anomalous event based on the comparison of the received operation data with (i) the threshold operating information defined for the node and (ii) the situational information. The exemplary communication device also includes a notification unit configured to output notification of the determined anomalous event.

An exemplary embodiment provides a method of operating a utility network communication device to detect anomalous events occurring in connection with at least one node in a utility network. The exemplary method includes defining, in the communication device, threshold operating information for nodes in the utility network. The threshold operating information includes configured acceptable operating parameters of the nodes in the utility network based on respective locational information of the nodes in the utility network. The exemplary method also includes defining, in the communication device, situational information for the nodes in the utility network. The situational information includes data indicative of configured operation data expected to be received from nodes in the utility network during a predetermined time period, based on at least one of a condition and an event occurring during the predetermined time period. The exemplary method also includes recording the defined threshold operating information and situational information in a memory unit of the communication device, and receiving operation data from at least one node in the utility network. In addition, the exemplary method includes comparing, in a processing unit of the communication device, the received operation data with the threshold operating information and the situational information which are respectively defined for the at least one node from which the operating data was received. The exemplary method also includes determining, in a processing unit of the communication device, whether the received operation data constitutes an anomalous event based on the comparison of the received operation data with (i) the threshold operating information and (ii) the situational information. Furthermore, the exemplary method includes outputting, from a notification unit of the communication device, notification of a determined anomalous event.

An exemplary embodiment provides a computer-readable recording medium having a computer program recorded thereon that causes a control unit of a utility network communication device communicatively connected to the computer-readable recording medium to detect anomalous events occurring in connection with at least one node in a utility network. The program causes the control unit of the communication device to execute an operation of defining threshold operating information for nodes in the utility network, where the threshold operating information includes data indicative of configured acceptable operating parameters of the nodes in the utility network based on respective locational information of the nodes in the utility network. The program also causes the control unit of the communication device to perform an operation of defining situational information for the nodes in the utility network, where the situational information includes data indicative of configured operation data expected to be received from nodes in the utility network during a predetermined time period based on at least one of a condition and an event that is occurring during the predetermined time period. In addition, the program causes the control unit of the communication device to perform operations of recording the defined threshold operating information and situational information in a memory unit of the communication device, and receiving operation data from at least one node in the utility network. Furthermore, the program causes the control unit of the communication device to perform operations of comparing the received operation data with (i) the threshold operating information and (ii) the situational information which are respectively defined for the at least one node from which the operating data was received, and determining whether the received operation data constitutes an anomalous event based on the comparison of the received operation data with (i) the threshold operating information and (ii) the situational information. In addition, the program also causes the control unit of the communication device to perform an operation of outputting notification of a determined anomalous event.

An exemplary embodiment provides a node in a utility network. The exemplary node in the utility network includes a network interface configured to enable the node to communicate with at least one other node in the utility network, and a control unit configured to detect anomalous events occurring in connection with the node in the utility network. The exemplary node in the utility network also includes a memory unit having defined and recorded therein threshold operating information including data indicative of configured acceptable operating parameters of the node during a predetermined time period. The threshold operating information recorded in the memory unit includes a threshold value indicating a maximum number of times that the network interface transmits a communication failure message to a first other node in the utility network attempting to communicate with the node during the predetermined time period. The control unit is also configured to adjust a value of a counter each time that the network interface transmits a communication failure message to the first other node, and generate operation data representing the adjusted value of the counter. In addition, the control unit is configured to compare the value of the counter represented in the generated operation data with the threshold value included in the threshold operating information recorded in the memory unit, and determine that an anomalous event has occurred when the threshold value included in the recorded threshold operating information has been reached, based on the comparison of the value of the counter with the threshold value included in the threshold operating information. The control unit is also configured to generate a notification signal indicating the determination of the anomalous event. The exemplary node in the utility network also includes a notification unit configured to transmit the notification signal generated by the control unit to a second other node in the utility network distinct from the first other node in the utility network.

An exemplary embodiment provides a node in a utility network. The exemplary node in the utility network includes a network interface configured to enable the node to communicate with at least one other node in the utility network, and a control unit configured to detect anomalous events occurring in connection with the node in the utility network. The exemplary node in the utility network also includes a memory unit having defined and recorded therein threshold operating information including data indicative of configured acceptable operating parameters of the node during a predetermined time period. The threshold operating information recorded in the memory unit includes a threshold value indicating a maximum number of times that the network interface receives a communication from a first other node in the utility network attempting to communicate with the node during the predetermined time period. The control unit is configured to adjust a value of a counter each time that the network interface receives a communication from the first other node, and generate operation data representing the adjusted value of the counter. In addition, the control unit is configured to compare the value of the counter represented in the generated operation data with the threshold value included in the threshold operating information recorded in the memory unit, and determine that an anomalous event has occurred when the threshold value included in the recorded threshold operating information has been reached, based on the comparison of the value of the counter with the threshold value included in the threshold operating information. The control unit is also configured to generate a notification signal indicating the determination of the anomalous event. The exemplary node in the utility network also includes a notification unit configured to transmit the notification signal generated by the control unit to a second other node in the utility network distinct from the first other node in the utility network.

An exemplary embodiment provides a node in a utility network. The exemplary node in the utility network includes a network interface configured to enable the utility meter to communicate with at least one other node in the utility network, and a control unit configured to detect anomalous events occurring in connection with the node in the utility network. In addition, the exemplary node in the utility network includes a memory unit having defined and recorded therein (i) a routing table including each downstream node which has registered with the node in the utility network to forward respective communications from the downstream nodes to another node constituting an upstream node of the node in the utility network, and (ii) threshold operating information including a threshold value indicating a number of the downstream nodes registered in the routing table which transmit an un-registration message to the network interface during a predetermined time period. The control unit is configured to adjust a value of a counter each time that the network interface receives an un-registration message from a downstream node registered in the routing table recorded in the memory unit, and generate operation data representing the adjusted value of the counter. The control unit is also configured to compare the value of the counter represented in the generated operation data with the threshold value included in the threshold operating information recorded in the memory unit, and determine that an anomalous event has occurred when the threshold value included in the recorded threshold operating information has been reached, based on the comparison of the value of the counter with the threshold value included in the threshold operating information. In addition, the control unit is configured to generate a notification signal indicating the determination of the anomalous event. The exemplary node in the utility network also includes a notification unit configured to transmit the notification signal generated by the control unit to the upstream node of the utility network.

An exemplary embodiment provides a node in a utility network. The exemplary node in the utility network includes a network interface configured to enable the node to communicate with at least one other node in the utility network, and a control unit configured to detect anomalous events occurring in connection with the node in the utility network. The exemplary node in the utility network also includes a memory unit having defined and recorded therein threshold operating information including data indicative of configured acceptable operating parameters of the node in the utility network during a predetermined time period. The threshold operating information recorded in the memory unit includes a threshold value indicating a maximum value of a commodity expected to be consumed at a premises at which the node is located during the predetermined time period. The control unit is configured to monitor a value of consumption of the commodity at predetermined increments of the predetermined time period, and generate operation data representing the monitored consumption value. The control unit is also configured to compare the consumption value represented in the generated operation data with the threshold value included in the threshold operating information recorded in the memory unit, and determine that an anomalous event has occurred when the consumption value represented in the generated operation data is greater than or equal to the threshold value included in the threshold operating information recorded in the memory unit. In addition, the control unit is configured to generate a notification signal indicating the determination of the anomalous event. The exemplary node in the utility network also includes a notification unit configured to transmit the notification signal to another node in the utility network with which the node in the utility network is authorized to communicate.

BRIEF DESCRIPTION OF THE DRAWINGS

Other objects, refinements and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION OF EXEMPLARY EMBODIMENTS

I. Exemplary Network

Figure 1:
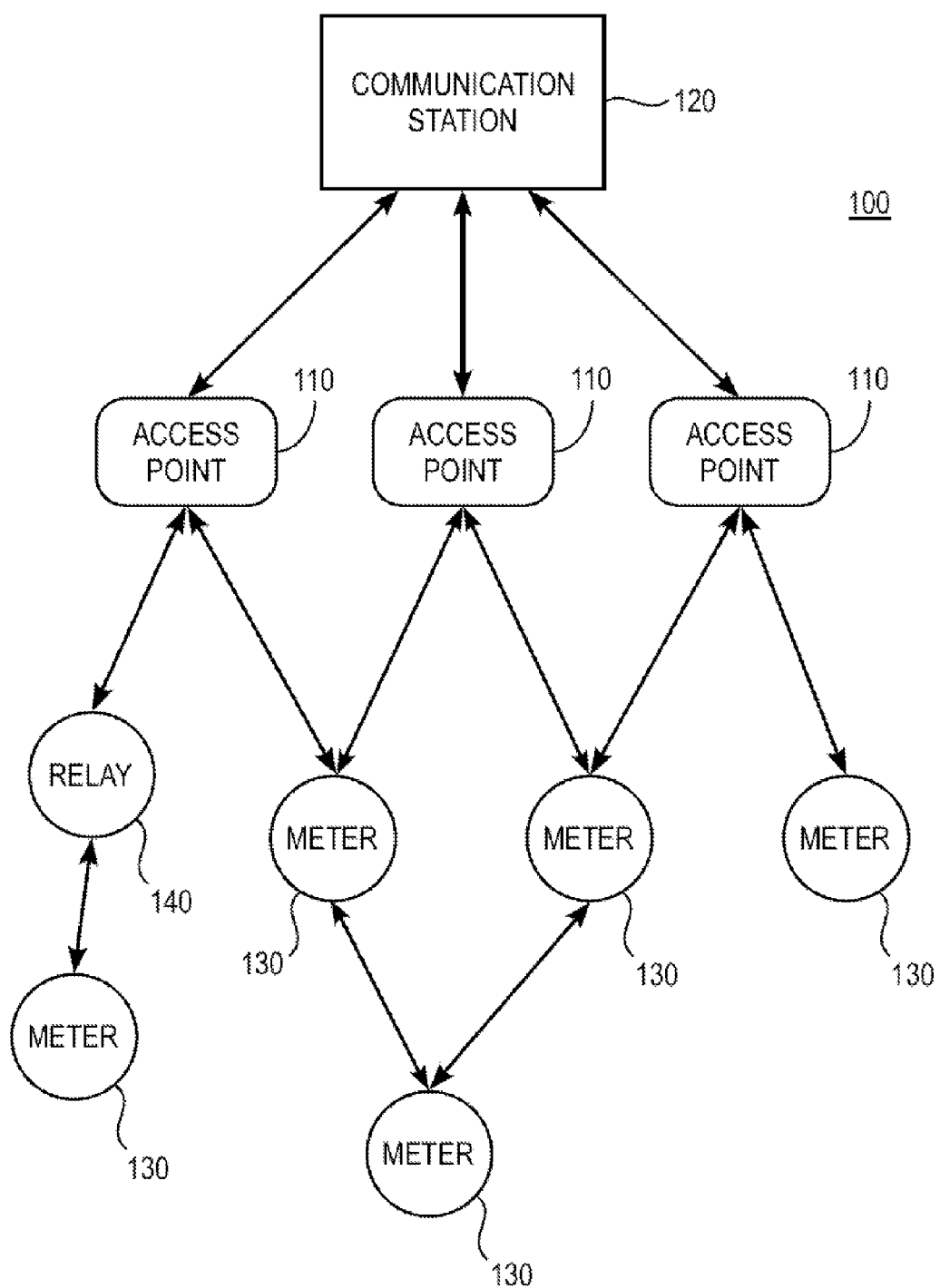
FIG. 1 is a block diagram of an exemplary configuration of an AMR/AMI network in which features of the present disclosure can be implemented.

FIG. 1 is a network diagram illustrating an exemplary configuration of an AMR/AMI network 100 in which features of the present disclosure can be implemented. FIG. 1 illustrates the AMR/AMI network 100 in the form of a mesh network, as an example of the type of network in which the present disclosure can be implemented. The present disclosure can be implemented in other types of networks. For example, the AMR/AMI network 100 can be a star network in which a plurality of nodes communicate according to predetermined communication paths with a central node, such as a communication station of a utility provider.

In the exemplary network configuration illustrated in FIG. 1, the network 100 employs one or more access points 110, e.g., gateways, that are connected to a communication station 120 of a utility provider. The connections between the access point(s) 110 and the communication station 120 may be provided by a wide area network (WAN), a virtual private network (VPN), or other suitable configuration, through wired and/or wireless communication mediums. The communication medium between an access point 110 and the communication station 120 is referred to as a backhaul. An access point 110 can have a different backhaul connection to the communication station 120 than another access point 110. For example, in the exemplary network 100 illustrated in FIG. 1, the access point 110 on the left hand side of the drawing can have a backhaul constituted by a WAN, the access point 110 in the middle of the drawing can have a backhaul constituted by fiber optic cables, and the access point 110 on the right hand side of the drawing can have a backhaul constituted by a VPN over a public network such as the Internet.

Each access point 110 can also connect directly or indirectly with one or more utility meters 130 via a wireless local area network (LAN), for example. The utility meters 130 can communicate with each other and with the access points 110 via the wireless LAN, to continuously keep track of preferred pathways for connection to one or more of the access points 110. The access points 110 constitute an interface between the communication station 120 and one or more utility meters 130 and/or relays 140.

It is also conceived that a meter 130 may communicate directly with the communication station 120 of the utility provider if an access point 110 is not within a predetermined proximity of the meter 130. Alternatively, the meter 130 may communicate directly with the communication station 120 if the quality of communication between the meter 130 and the communication station 120 exceeds the quality of communication between the meter 130 and an access point 110, or exceeds the quality of communication between the access point 110 and the communication station 120. According to an exemplary embodiment, relay stations 140 may also be provided in the network 100 as repeater stations between meters 130 and one or more of the access points 110 or communication station 120.

According to exemplary embodiments as provided herein, the utility meters 130 are enabled to communicate with each other and other access points 110 and relay stations 140 of the network 100 by being equipped with a utility network interface device. An example of a utility network interface device is a network interface card (NIC), which will be described in further detail herein. It will be appreciated by those skilled in the art that the operative functions performed by the meter 130, as described herein, can be performed by the utility network interface device (e.g., NIC) associated with the meter 130. The NIC can be associated with the meter 130 by being integrated in, physically attached to, and/or electrically connected to the meter 130. Accordingly, as used herein, any reference to a utility meter 130 is intended to encompass a utility meter 130 having a utility network interface device associated with the utility meter 130, or a utility meter 130 that includes constituent components corresponding to the structural features of a utility network interface device as described herein and/or constituent components that can perform the operative functions of a utility network interface device as described herein.

In the exemplary utility network 100 illustrated in FIG. 1, the access points 110, the communication station 120, meters 130 and relays 140 are examples of nodes in the network 100. The term "node," as used herein, connotes a device having communicative functions in the network 100.

The addition or subtraction of meters 130, as nodes in the network 100, is dynamically accommodated in the network 100. Examples of techniques for connecting and/or disconnecting meters to/from an AMR/AMI network of a utility provider and establishing communication protocols between the nodes in the network are disclosed in co-pending U.S. application Ser. Nos. 11/732,964 and 12/139,413, now U.S. Pat. Nos. 7,692,101 and 7,889,094, respectively, the entire contents of which are hereby incorporated by reference. An example of a technique for establishing security protocols for added and/or disconnected nodes in an AMR/AMI network such as the network 100 illustrated in FIG. 1 is disclosed in co-pending U.S. application Ser. No. 12/187,354, the entire contents of which are hereby incorporated by reference.

II. Exemplary Utility Network Interface Device

Figure 2:
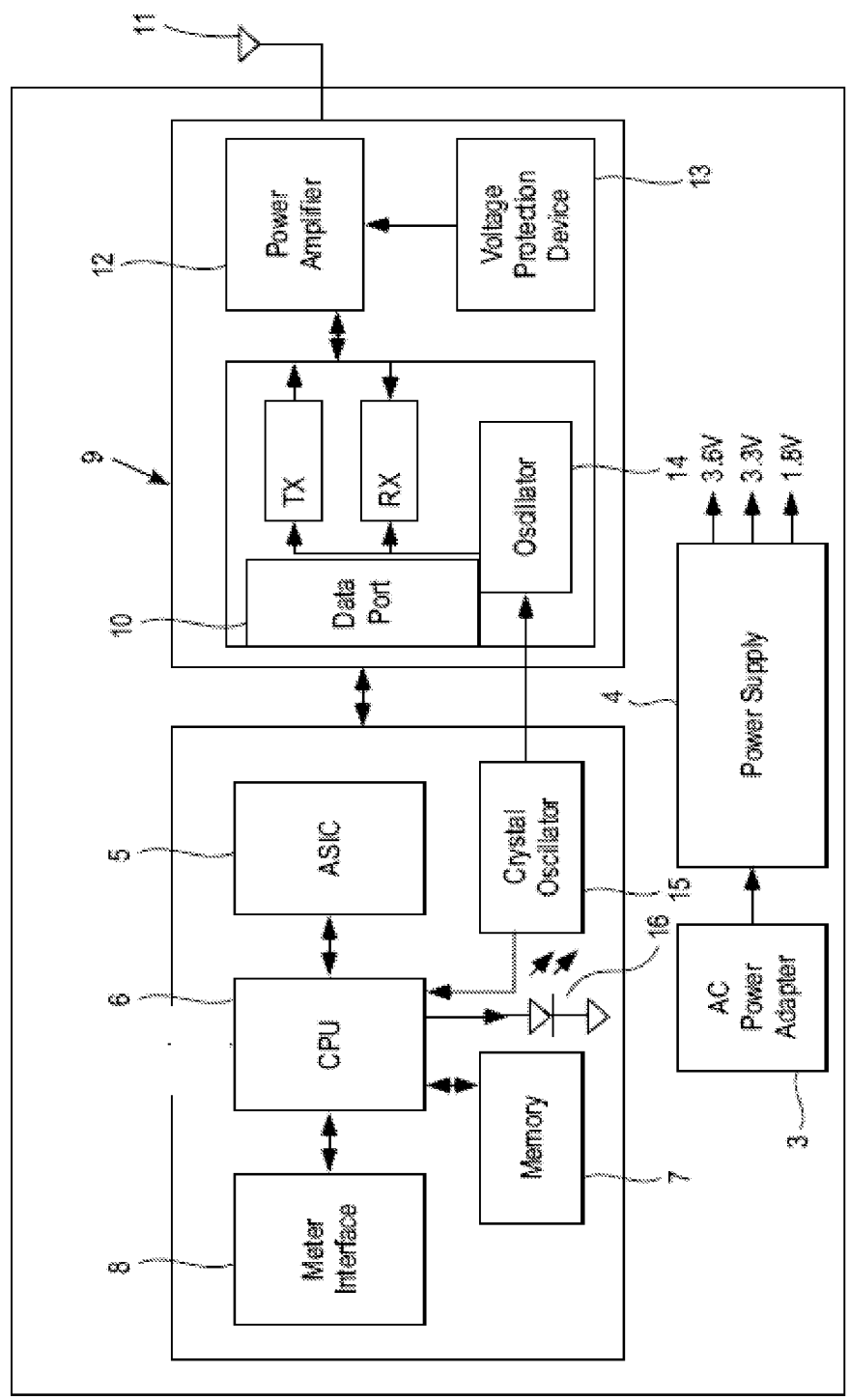
FIG. 2 is a block diagram of an exemplary configuration of a utility network interface device according to at least one embodiment.

FIG. 2 is a block diagram illustrating an exemplary configuration of a utility network interface device configured to operate in conjunction with a utility meter 130, such as gas, electric and water meters, for example. To enable the utility meters 130 to communicate with the various nodes (e.g., access points 110, communication station 120, other utility meters 130, relays 140, etc.) in the network 100, utility meters 130 of the AMR/AMI network 100 are provided with a utility network interface device. As discussed above, a NIC is an example of a utility network interface device. A NIC 2 is a module that can be attached to or incorporated within a utility meter 130 to constitute the utility network interface device of the utility meter 130. According to an exemplary embodiment, the NIC 2 may be constituted by a single printed circuit board. FIG. 2 illustrates an exemplary configuration of a NIC 2 in which the structural components of the NIC 2 are mounted on a single printed circuit board.

As illustrated in FIG. 2, the NIC 2 may include an AC power adapter 3 and a power supply 4. The AC power adapter 3 connects an external power source to the power supply 4 to provide an input voltage to the power supply 4. The external power source may constitute a power source in the utility meter 130 to which the NIC 2 is attached, and/or a power source external to the utility meter 130. The power supply 4 converts the input voltage to various output voltages for the various powered components of the NIC 2. Alternatively or as a backup, the input voltage for the power supply 4 can be provided by a battery provided on the NIC 2. For example, in the event that the AC power adapter 3 connects an external power source (e.g., a load terminal at an electric meter) to the power supply 4 to normally power the NIC 2, the battery power supply can be used to power the NIC 2 in the event of a power outage.

An Application-Specific Integrated Circuit (ASIC) 5 of the NIC 2 is encoded to control the components of the NIC 2 via a Central Processing Unit (CPU) 6 and a memory 7. The CPU 6 can be an ARM processor, for example. The CPU 6 is configured to control the operations of the NIC 2. The CPU 6 can include, for example, a processor for controlling the aggregate operations of the NIC 2, a non-volatile memory, such as a read-only memory (ROM) and/or flash memory, for example, that stores programs, such as firmware, application programs, and logic instructions which are executed by the processor, and a volatile memory, such as a random-access memory (RAM), for example, that is used as a working memory by the processor when executing the firmware, programs and/or logic instructions stored in the non-volatile memory. The firmware stored in the non-volatile memory includes programmed instructions for carrying out basic (i.e., fundamental) operations of the NIC 2, and may also include an operating system (OS) of the NIC 2. The feature of a "control unit" of the NIC 2 as described herein can be encompassed by the CPU 6 individually or in combination with the ASIC 5. The memory 7 and the non-volatile memory of the CPU 6 are examples of a computer-readable recording medium on which an operating system and/or application programs of the NIC 2 can be recorded and executed by the control unit of the NIC 2. The control unit of the NIC 2 is configured to communicate with any of these computer-readable recording media and thus is communicatively connected to these computer-readable media.

A meter interface 8 of the NIC 2 is operatively connected to the CPU 6 and receives measured usage data and other operational metrics data from the utility meter. According to an exemplary embodiment, the meter interface 8 can also send information to the utility meter as needed, such as a command to shut off power to the premises associated with the meter, for example.

A transceiver 9 is provided on the NIC 2 for communicating wirelessly with the utility network 100. The transceiver 9 is an example of a network interface that enables the NIC 2 to communicate with other nodes in the utility network 100. As shown in FIG. 2, the transceiver 9 includes a data port 10 for providing a two-way data connection between the transceiver 9 and the CPU 6. Similarly, an antenna 11 provides a two-way data connection between the transceiver 9 and the utility network 100. A power amplifier 12 drives the antenna 11 and is surge protected by a voltage protection device 13. An oscillator 14 generates a suitable carrier frequency for the power amplifier 12, e.g. 1.8 Ghz. A crystal oscillator 15 generates an appropriate frequency, e.g. 9.2 Mhz, which provides a stable clock signal to the CPU 6 and the ASIC 5, and also stabilizes the carrier frequency of the oscillator 14. When the meter and NIC 2 are powered up, the CPU 6 controls the transceiver 9, by way of commands received from the ASIC 5, to progress through various stages of network connection, to thereby establish the meter 130 as a functioning node in the network 100.

In the illustrated embodiment, an LED 16 is provided on the NIC 2 and operatively connected to the CPU 6, to indicate the status of the meter and the NIC 2 during an attempted connection of the utility meter 130 with the utility network 100. In an exemplary embodiment, a single color LED can be used. In this case, the CPU 6 can communicate the various states of connectivity by controlling the LED 16 to vary its flash pattern. Alternatively, a multi-color LED, such as a tri-color LED, can be used, and selectively controlled by the CPU 6 to illustrate various states respectively associated with predefined color and/or flashing patterns. A more detailed discussion of these operations can be found in previously identified application Ser. No. 12/139,413.

III. Generation and Transmission of Operation Data from Nodes in the Utility Network In operation, the utility meters 130 monitor one or more operating parameters of the utility meter 130, and generate and transmit operation data representing the monitored operating parameter(s) of the utility meter 130. For example, the utility meters 130 can monitor usage data representing an amount of a commodity consumed over a particular period of time, generate operation data representing the monitored usage data, and transmit the generated operation data to the communication station 120 of the utility provider via the network 100. For example, an electric utility meter 130 can transmit to the communication station 120 an amount of electric power consumed at the location of installation of the utility meter 130 on an hourly basis. The frequency of communication between the utility meter 130 and the communication station 120 can be defined to occur at any desired time interval to facilitate proper operation of the meters 130 and collection of operation data from the meters 130.

The utility meters 130 can also monitor operational metrics associated with the operation of the NIC 2 and/or associated meter, generate operation data representing the monitored operational metrics, and transmit the generated operation data to the communication station 120. The following are examples of the types of operational metrics data that a utility meter 130 can monitor and transmit to the communication station 120. For example, the utility meters 130 can transmit (i) security credential information of the meter 130, (ii) network status information, such as whether the meter 130 encountered any transmission or reception failures in communicating with another node in the network 100, (iii) operational power information, such as if the meter 130 was powered off for a predetermined period, if the power supply to the meter 130 is below a prescribed operational threshold, and if the meter 130 switched to battery power during operation due to an interruption in the AC power supply, (iv) restart information, such as when the meter 130 restarts (reboots), as well as the number of times that the meter 130 has restarted over a predetermined period of time, (v) commodity attribute information such as the temperature, pressure, and voltage values of the commodity being supplied to the utility meter 130, and (vi) counter information including an integer value (e.g., the number four (4)) representing a value counted by the control unit of the NIC 2, such as the number of times the NIC 2 has received a request to communicate with another node in the utility network 100. The usage data and operational metrics data that can be monitored in the meter 130 and transmitted from the meter 130 to the communication station 120 will collectively be referred to as "operation data" hereinafter, unless otherwise noted. The operation data transmitted from a meter 130 to the communication station 120, via one or more other meters 130 and/or an access point 110, for example, can include one or more of the above-described types of usage data and operational metrics data.

The communication station 120 records the operation data received from each node in the network 100 at the time the operation data is received. The communication station 120 maintains an information database that has recorded therein the operation data received from each node in the network 100, as well as the operation data received from each node in relation to other nodes in the network 100. For example, the communication station 120 can record operation data for a plurality of nodes in a predetermined geographic area.

The exemplary utility network 100 illustrated in FIG. 1 is distinct from the distribution network (e.g., electrical, gas, water distribution networks) which distributes a particular commodity to the meters 130. The exemplary utility network 100 is a communication network through which the meters 130 can communicate with the communication station 120 of the utility provider, either directly with the communication station 120, or via one or more other meters 130, access points 110, and/or relays 140. The exemplary utility network 100 therefore operates in conjunction with the distribution network, in that the exemplary utility network 100 enables the nodes in the utility network 100 to communicate with the communication station 120 to report operation data to the communication station 120 and to receive operation commands from the communication station 120, whereas the distribution network distributes (i.e., supplies) one or more commodities to the meters 130. Therefore, while the exemplary network 100 permits the communication station 120 of the utility provider to communicate with the nodes in the network 100, it is to be understood that the exemplary communication network 100 is distinct from the distribution network that distributes a particular commodity to the meters 130 with which the NICs 2 are respectively associated. Accordingly, as used herein, reference to a node or nodes in the utility network 100 is intended to encompass utility meters 130, access points 110 and/or relays 140 having a utility network interface device associated therewith, to enable the utility meter 130, access point 110 and/or relay 140 to communicate with the communication station 120 of the utility provider via the exemplary utility network 100. In addition, the communication station 120 of the utility provider constitutes a node in the utility network 100.

IV. Exemplary Communication Station

Figure 3:
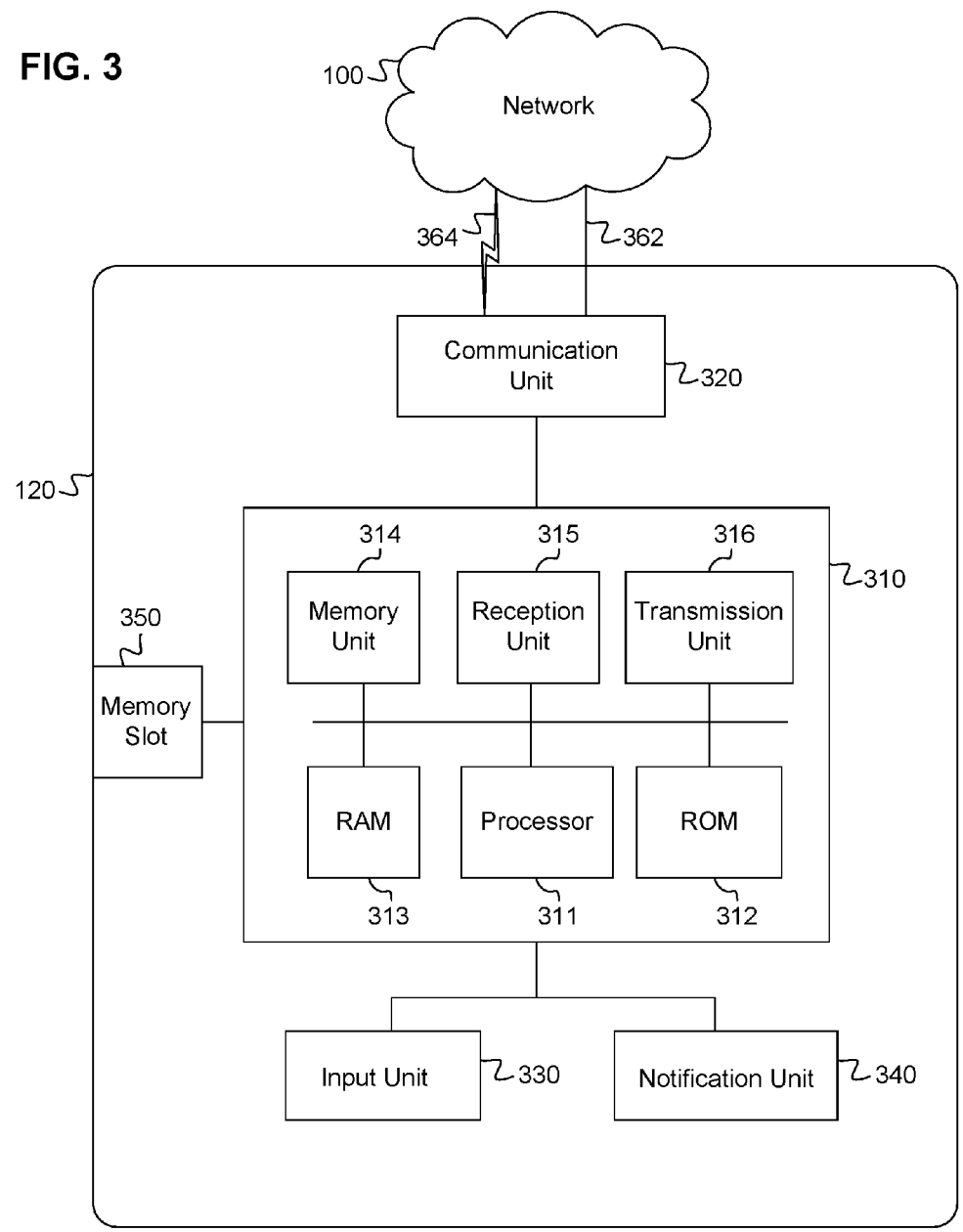
FIG. 3 is a block diagram of an exemplary configuration of a communication station of a utility provider according to at least one embodiment.

FIG. 3 is a block diagram of an exemplary configuration of the communication station 120 of a utility provider according to at least one embodiment. As shown in FIG. 3, the communication station 120 includes a control unit 310, a communication unit 320, an input unit 330, a notification unit 340, and a memory slot 350.

The control unit 210 includes a processing unit 311, a ROM 312, a RAM 313, a memory unit 314, a reception unit 315, and a transmission unit 316. The processor unit 311 controls the aggregate functions of each component of the communication station 120. The processor unit 311 may include a general-purpose processor such as an ARM processor, and/or an ASIC. The ROM 312 stores programs, such as an operating system and computer-readable application programs, and logic instructions which are executed by the processor unit 311. The memory unit 314 is a non-volatile memory which can also record computer-readable application programs. The memory unit 314 also has recorded therein the aforementioned information database of operation data received from the nodes in the network 100. The memory slot 350 is configured to receive a removable non-volatile memory card and/or disc inserted therein, such as a CD-ROM, DVD-ROM, BD-ROM, flash memory, optical memory, etc. The memory slot 350 communicatively couples terminals of the removable memory card/disc to the control unit 310 to provide the components of the control unit 310 access to data and application programs recorded on the memory card/disc, and to store data thereon. The RAM 313 is used as a working memory by the processor unit 311 when executing the programs and logic instructions recorded in the ROM 312, memory unit 314 and/or memory card/disc inserted into the memory slot 350. The ROM 312, memory unit 314 and memory card/disc inserted into the memory slot 350 are examples of a computer-readable recording medium on which an operating system and/or application programs of the communication station 120 can be recorded and executed by the processor unit 311. The processing unit 311 is configured to communicate with any of these computer-readable recording media and thus is communicatively connected to these computer-readable media.

The reception unit 315 receives data from the communication unit 320 and forwards the received data to the processor unit 311 for appropriate processing. The transmission unit 316 receives data that is instructed to be sent to the communication unit 320 by the processor unit 311, and transmits the instructed data to the communication unit 320.

The communication unit 320 is an interface between the communication station 120 and the nodes in the network 100. The communication unit 320 is configured to transmit information and/or control instructions from the communication station 120 to the nodes via a wired transmission medium 362 and/or a wireless transmission medium 364. The communication unit 320 can transmit the information and/or control instructions to one or more nodes as individual messages, a multicast message or a broadcast message. The communication unit 320 also receives operation data from the nodes via the wired transmission medium 362 and/or wireless transmission medium 364. Received operation data is forwarded to the processor unit 311 by the reception unit 315. The processing of the operation data by the processor unit 311 will be described in greater detail below.

The input unit 330 can include keys and pointing devices that can be manipulated by an operator of the communication station 120. For example, the input unit 330 can include a QWERTY keyboard, a trackball or similar selecting and pointing device, a number pad, etc. The input unit 330 can include a display device configured to visually display an input received by such keys and/or pointing devices. The input unit 330 can also include a multi-input touch screen with a virtual keyboard and buttons represented in a graphical user interface (GUI). The input unit 330 is configured to receive operating instructions from an operator of the communication station 120. Operating instructions received by the input unit 330 are forwarded to the processor unit 311.

The notification unit 340 can be an audio and/or video (AV) device configured to output an audible and/or visual notification, including any data pertaining or relevant to the notification. As will be described in more detail below, the control unit 310 is configured to determine when an anomalous event occurs in connection with the operation of one or more nodes of the communication network 100, based on the operation data received from one or more nodes in the communication network 100. The notification unit 340 is configured to output notification of a determined anomalous event at the time the anomalous event is determined to have occurred. As such, the notification unit 340 provides real-time notification when an anomalous event is determined to have occurred with respect to one or more nodes in the communication network 100.

V. Threshold Operating Information

The memory unit 314 includes the aforementioned information database, which has defined and recorded therein threshold operating information for nodes in the communication network 100. The threshold operating information includes data indicative of configured acceptable operating parameters of nodes in the communication network 100 based on respective locational information of the nodes in the communication network 100. The threshold operating information defines a threshold value or a range of threshold values (i.e., maximum and minimum values) for each type of information to be monitored by the communication station 120.

In addition to or as an alternative to defining a threshold value or a range of threshold values, the threshold operating information can also define a predetermined state or condition, such as a state signal indicating the occurrence or non-occurrence of a current state or condition (e.g., on or off, connected or not connected, true or false, etc.). The state signal can include a binary value such as zero (0) or one (1) to represent the occurrence or non-occurrence of the state or condition to be monitored by the communication station 120. In this case, the threshold value defined in the threshold operating information can be the existence or non-existence of the value representing the occurrence or non-occurrence of the predetermined state or condition. For example, if the threshold operating information defines whether a premises at which a meter 130 is located is currently receiving a particular commodity from the associated distribution network, the threshold operating information can include a value of one (1) to indicate that the associated premises is currently receiving with the commodity, or a value of zero (0) to indicate that the associated premises is not currently receiving the commodity. The threshold operating information can be defined based on a various number of factors. For example, the threshold operating information can be preliminarily based on historical operating patterns of one or more nodes for which the threshold operating information is defined. The threshold operating information can also be based on configured threshold values that are defined for residential or commercial premises or distribution devices of a distribution network having similar usage, operational, functional and/or geographic characteristics as the node for which the threshold operating information is defined. The threshold operating information defined in the memory unit 314 can be configured by an operator of the communication station 120, and can be modified at any time to reflect changes in operating conditions of the node, the communication network 100 and/or the distribution network, for example. The threshold operating information can be recorded with version information identifying the number of times the threshold operating information has been modified for the node for which the threshold operating information is defined, to illustrate a historical progression in the threshold operating information, and to permit the threshold operating information to be returned to previous versions if appropriate. The threshold operating information defined for a node can include any operating parameter of a node of the communication network 100 which is desired to be monitored. The number of operating parameters defined in the threshold operating information for one node can differ from the number of operating parameters defined in the threshold operating information for another node.

The threshold operating information recorded in the memory unit 314 is unique to each node, such that unique threshold operating information is respectively defined and recorded for each node in the utility network. As discussed above, the threshold operating information is defined for each node based on locational information. The locational information defines unique information about the node for which the threshold operating information is defined, and thus the threshold operating information of a node, which is based on the locational information of the node, is unique for each node.

VI. Examples of Locational Information

For example, the locational information can define: (1) geographic information about the premises where the node is located, such as geographic coordinates of the premises (e.g., GPS coordinates), a geographic area in which the premises is located, a number and type of other residences or businesses within the geographic area, the location of the premises with respect to a common access point 110 or multiple access points 110 located within a predetermined proximity to each other that serve the premises, and/or common geographic utility distribution information, such as whether the premises are connected to the same backhaul to the communication station 120, and whether the premises are on the same distribution grid element, such as a substation, transformer and/or feeder of the distribution network, etc.; (2) connection information indicating whether the node is currently connected or disconnected to a particular distribution network to receive the commodity supplied by the distribution network, and the number of distribution networks to which the node is connected (e.g., electricity, gas, water); (3) residential usage information of the premises, such as whether the node is located at a residence with high turnover, including apartments, rental properties, mobile homes, etc.; (4) attribute information of the premises, such as whether the premises is a residential dwelling, a commercial building, a device of the distribution network (e.g., a distribution transformer and/or feeder of a distribution network) and/or a device of the network 100 (e.g., an access point, a remote terminal unit (RTU) collecting metering data at a distribution device of a distribution network), and attributes such as the square footage of the premises and a building style of the premises, including whether the premises is physically attached to other premises (e.g., town homes, or commercial properties constituting part of a larger premises, such as a shopping mall), or whether the premises is physically detached from other premises; (5) premises comparison information indicating a comparative size of the premises relative to other premises in a predetermined geographic area; (6) load usage information indicating devices serviceable at the premises, such as whether a premises is equipped with an HVAC compressor furnace, room heaters, a water heater, aquatic devices such as a pool pump, spa or Jacuzzi, so-called "smart" appliances, a charge receptacle for a plug-in hybrid electric vehicle (PHEV), etc.; (7) functional information describing a functional use of the premises, such as whether the premises is a restaurant, a grocery store, a hotel, a device of the distribution network, etc.; (8) periodic usage patterns indicating historical consumption of a particular commodity during a predetermined period of time, such as historical consumption of electricity during the summer, and historical consumption of gas during the winter, etc.; (9) financial information such as whether the customer at the premises is in arrears for payment of consumption of the commodity at the premises, and the frequency of which the customer is in arrears; and (10) construction information indicating a construction and/or repair date of the premises and the materials used for constructing the premises and/or device of the distribution network, such as the date of construction and the materials used to construct a transformer in a distribution network.

The foregoing types of information that can be defined in the locational information for a node for which threshold operating information is defined and recorded in the memory unit 314 are examples, and the present disclosure is not limited thereto. It is to be understood that the locational information defined for a premises at which a node in the communication network 100 is located, can be any information which uniquely defines the premises, and can include any combination of different types of information which uniquely define the premises.

VII. Locational Information Defined for a Node Enables Unique Threshold Operating Information to be Defined for Each Node The locational information defined for a node thus enables respectively unique threshold operating information to be defined and recorded for each node in the utility network. For example, suppose that a predetermined geographic area contains both residential and commercial premises. In this example, the geographic area is defined as a number of premises being serviced by a common access point 110 in the network 100. In this geographic area, there are ten residential premises, two commercial premises, and one distribution device of a distribution network. As discussed above, the threshold operating information can be based on configured threshold values that are defined for residences, businesses or distribution devices of the distribution network having similar usage, operational, functional and/or geographic characteristics as the node for which the threshold operating information is defined. In formulating the threshold operating information for the residential homes, the configured threshold values for the ten residential homes can be preliminarily based on an empirical average monthly consumption rate of 1,000 kWh for residential premises in this geographic area, for example. However, in this example, the ten residential premises possess relatively unique attributes, and therefore, recording a common definition for the threshold operating information may not accurately reflect the attributes and operating parameters of these residential premises.

Among the ten residential premises in the above example, four of the residential premises are townhomes arranged successively in a row in an order of townhome A, townhome B, townhome C and townhome D. In this example, townhomes A and D on the edges of the row are physically attached to one other townhome (i.e., townhomes B and C, respectively), and townhomes B and C in the middle of the row are physically connected to two other townhomes (i.e., townhomes A and C, and townhomes B and D, respectively). Each of these townhomes is approximately 2,500 square feet in size. Among the ten residential premises in the above example, two of the residential premises are detached homes. Among these detached homes, one of the homes is approximately 8,000 square feet in size, while the other detached home is 15,000 square feet in size. The other four residential premises are apartments that are each sub-units of a three-story building. Suppose, for example, that apartment 1 is located on the first floor, apartments 2 and 3 are located on the second floor, and apartment 4 is located on the third floor of the apartment complex. Apartments 1 and 4 are each approximately 1,500 square feet in size. Apartments 2 and 3 are each approximately 750 square feet in size.

In view of these attributes, unique threshold operating information can be defined for each of the residential premises in the geographic area based on respective locational information. For example, the attribute information and premises comparison information concerning the respective square footage of the two detached homes can be defined as two of the above-identified types of locational information for the detached homes. In this case, the average monthly consumption rate of 1,000 kWh may not be appropriate for the detached homes. As such, the threshold operating information for the two detached homes can include an increased monthly consumption rate, in view of the likelihood that the detached homes would consume a greater amount of a particular commodity in a given month, as compared to the average monthly consumption rate for that geographic area. For example, the threshold operating information defined and recorded in the memory unit 314 for the 8,000 square foot detached home can have a maximum threshold value of 2,000 kWh per month, and the threshold operating information defined and recorded in the memory unit 314 for the 15,000 square foot house can have a maximum threshold value of 3,000 kWh per month. These maximum threshold values defined in the threshold operating information for the detached homes include data indicative of configured acceptable operating parameters for the detached homes based on their respectively unique locational information.

With respect to the four townhomes in the above example, the respective locational information of each townhome can provide the townhomes with unique threshold operating information. For example, threshold operating information defined for townhomes B and C can have a comparatively lower maximum threshold value of monthly power consumption than townhomes A and D located on the edges of the row of townhomes. For example, based on periodic usage pattern information recorded in the memory unit 314, townhomes B and C have historically consumed, on average, less power in a month than townhomes A and D. Based on this locational information, the threshold operating information defined and recorded in the memory unit 314 for townhome B can have a maximum threshold value of 900 kWh per month. However, suppose, for example, that townhome C is equipped with a charge receptacle for a PHEV. Based on this additional load usage information, the threshold operating information defined and recorded in the memory unit 314 for townhome C can be increased to have a maximum threshold value of 1,200 kWh per month, based on the increased power consumption for charging the PHEV. Unique threshold operating information can also be defined and recorded in the memory unit 314 for townhomes A and D, based on their respective unique locational information. For example, suppose that townhome A has an HVAC compressor furnace which increases the amount of power consumed at townhome A relative to townhome D. Consequently, the threshold operating information defined and recorded in the memory unit 314 for townhome A can have a maximum threshold value of 1,300 kWh, whereas the threshold operating information defined and recorded in the memory unit 314 for townhome D can have a maximum threshold value of 1,100 kWh.

Utility providers attempt to implement appropriate load management to provide efficient distribution of a particular commodity and efficient revenue collection. To achieve these goals, utility providers have implemented the feature of remote disconnect and remote connect (hereinafter abbreviated as "remote disconnect/connect"), by which a meter 130 at a node in the utility network 100 can be disconnected from the distribution network to cease reception of a commodity and connected (or re-connected) to the distribution network to begin or resume reception of the commodity. The disconnection and/or connection of the meter 130 from/to the distribution network can be performed by the communication station 120 via the network 100, without affecting the connection of the meter 130 to the utility network 100. For example, the control unit 310 of the communication station 120 can control the communication unit 320 to transmit a remote disconnect command and/or a remote connection command to a particular node in the network 100. Upon receiving the remote disconnect command, the control unit of the NIC 2 can control the meter interface 8 of the NIC 2 to transmit information to the associated utility meter 130 to disconnect the load terminal of the meter 130 from the source terminal of the meter 130, for example. When the load terminal of a meter 130 is remotely disconnected from its source terminal, the meter 130 is not disconnected from the utility network 100. On the contrary, the meter 130 continues to be a node in the network 100 due to the provision of the NIC 2. The remote disconnection and/or connection of the meter 130 obviates the need for service personnel of a distribution network to visit the physical location of the meter 130 to disconnect or connect the meter 130 from/to the distribution network. When a meter 130 is remotely disconnected or connected, the meter 130 can transmit to the communication station 120 operation data indicating that the meter 130 has been remotely disconnected or connected. The threshold operating information defined and recorded in the memory unit 314 can include a threshold value of remote connect/disconnects that can be issued against a particular meter 130 in a predetermined time period.

As described above, the locational information of a node can include residential usage description information which indicates, for example, whether the node is located at a premises with high turnover. In the foregoing example, the locational information defined for the nodes respectively located at apartment units 1-4 can indicate that the nodes are located at a transient residence with high turnover, in addition to or as an alternative to defining maximum and/or minimum threshold values for consumption of a particular commodity. For example, the threshold operating information defined for the node at apartment 1 located on the first floor of the three-story apartment complex can have a maximum threshold value of two remote connect/disconnects per month. The respective threshold operating information defined for the nodes at apartments 2-4 can similarly have a maximum threshold value of remote connect/disconnects per month. The maximum number of remote connect/disconnects per month indicate configured operating parameters of these nodes, based on respective locational information of each node. In addition to defining a maximum threshold value of remote connect/disconnects per month, the threshold operating information defined and recorded in the memory unit 314 for each node at the apartment complex can also include other operating parameters, such as expected power consumption values for a given time period, based on the size of the apartment, the utilities installed in the apartment, historical usage patterns, etc. Furthermore, the threshold operating information respectively defined for each node at apartments 1-4 can also include information on the particular commodities that the premises associated with the meters are authorized to receive. For example, if electrical power has been turned off for apartment 2 due to a current vacancy at the apartment, the threshold operating information defined for the node at apartment 2 can include information indicating that apartment 2 is not presently authorized to receive electricity from the appropriate distribution network.

In the foregoing example, two commercial premises (e.g., commercial premises A, and commercial premises B) and a distribution device of a distribution network are located in the geographic region that is defined as the number of premises being serviced by the same access point 110. Suppose, for example, that commercial premises A is a supermarket, commercial premises B is a five-story office building, and the distribution device is a distribution transformer of an electrical distribution network. The locational information respectively defined for the nodes located at commercial premises A and B and the distribution device can each include, for example, one or more of (i) attribute information indicating that the nodes are located at a commercial premises or are a distribution device of a distribution network, and the square footage of the respective premises, (ii) load usage information indicating device loads at the respective premises, (iii) functional information describing a function of the premises, (iv) periodic usage pattern information indicating historical consumption of a commodity being monitored, and (v) construction information indicating construction and/or repair information of the premises. For example, with respect to the supermarket of premises A, the locational information can indicate that the supermarket is 20,000 square feet, and is equipped with ten commercial refrigeration units as well as ten commercial freezers. The threshold operating information can thus be uniquely defined for the supermarket based on this locational information.

In addition, the supermarket may have a contractual agreement with a distribution network to reduce power consumption during periods of heavy load in the distribution network, via a HAN or similar localized network, using Zigbee or another protocol, for example. In such a situation, the communication station 120 can transmit a control command to the node(s) at the meter(s) 130 of the supermarket to temporarily turn off one or more of the refrigerators and/or freezers of the supermarket for a predetermined time period. For example, to control demand at peak times such as during hot days in the summer or cold days in the winter, the communication station 120 can utilize so-called "demand response events" to automatically adjust the thermostat settings of one or more of the refrigerators and/or freezers of the supermarket by a predetermined number of increments and/or a predetermined coefficient for a limited time period. For instance, during a warm period in the summer, an electrical distribution network may have a contractual agreement with the supermarket whereby the refrigeration and freezer units of the supermarket are to be temporarily turned off for a period of ten minutes in an hour during the time of increased demand in the distribution network. The threshold operating information defined and recorded in the memory unit 314 for the supermarket can therefore include information on the time and duration that each demand response event is to occur or has occurred, and when the demand response event is to be concluded according to the scheduled demand response event. Any maximum threshold values for consumption of a particular commodity can be modified in the threshold operating information defined for the node(s) at the supermarket to reflect the occurrence of a demand response event.

The threshold operating information defined for commercial premises B and the distribution device may also be based on the unique locational information of these premises. For example, in the case of the five-story office building of commercial premises B, attribute information and functional information defined in the locational information for the node of commercial premises B can include usage data for particular time periods. For instance, the locational information defined for commercial premises B can include information that the commercial premises B is located in a warm climate area, and that electricity consumption during the summer months is increased to provide air conditioning to the commercial premises B. The locational information can also include functional information indicating that the commercial premises B is customarily occupied during the morning and afternoon, and that electricity consumption values are increased during these times of the day.

In the foregoing example, the distribution device is a distribution transformer of an electrical distribution network. Similar to meters 130 located at residential or commercial premises, distribution devices of a distribution network (e.g., substations of the distribution network) can be equipped with a NIC 2 to enable monitoring of usage, distribution and operation patterns at the particular distribution device, and communication of such monitored values to the communication station 120 of the utility provider. A data acquisition device, such as a remote terminal unit (RTU), can be installed at the distribution device of the distribution network. The RTUs installed at the distribution devices record various operational metrics and threshold settings such as voltage, current, switch status, temperature, and oil levels, for example. A NIC 2 associated with the RTU can monitor these operational metrics and threshold settings, via the meter interface 8, and communicate the monitored values to the communication station 120 of the utility provider. Accordingly, RTUs having an associated NIC 2 can be one example of the types of meters 130 illustrated in the utility network 100 of FIG. 1. Similar to utility meters 130 located at a residential and commercial premises, a NIC 2 associated with an RTU is configured to measure and communicate operation data (e.g., consumption data and operational metrics data) collected by the RTU and/or the associated meter at the distribution device to the communication station 120.

For example, in the case of a distribution transformer of an electrical distribution network, the NIC 2 associated with the RTU of the distribution transformer can measure and communicate operation data such as voltage, current and temperature values as well as a status of switch reclosers at the distribution transformer to the communication station 120 via the utility network 100. In the case of a distribution feeder for a gas distribution network, the NIC 2 associated with the RTU of the distribution feeder can measure and communicate operation data such as temperature, pressure and gas levels to the communication station 120 via the utility network 100. Similarly, in the case of a distribution device of a water distribution network, the NIC 2 associated with the RTU of the distribution device can measure and communicate operation data such as pressure, flow rate and temperature values of the commodity to the communication station 120 via the utility network 100.

In accordance with the above example, locational information defined for commercial premises C can include, for example, a geographic location of the distribution transformer of the electrical distribution network, information about a number of other nodes in the utility network 100 located at premises that receive power distributed from the distribution transformer, maximum and/or minimum threshold values for voltage, current and temperature values that can be measured at the distribution transformer, and construction information indicating the materials used to construct the distribution transformer and the date on which the distribution transformer was put into service in the distribution network. Unique threshold operating information can therefore be defined and recorded in the memory unit 314 based on this unique locational information.

It is to be understood that the locational information, and hence the threshold operating information, defined for a node in the utility network 100 is customizable to accommodate any operating condition of the premises at which the node is located.

In the foregoing example, unique threshold operating information is recorded in the memory unit 314 for each node in the particular geographic area being monitored. Threshold operating information can also be collectively defined and recorded in the memory unit 314 for a plurality of nodes in a particular geographic area. For example, unique threshold operating information can be collectively defined for the four townhomes A-D, to assist in determining if an anomalous event has occurred with respect to the townhouse complex. Similarly, unique threshold operating information can be collectively defined for all nodes in a particular geographic area, such as all nodes being serviced by a common access point 110. Recording such collective threshold operating information for the entire geographic area can facilitate detection of an anomalous event with respect to one or more nodes in that geographic area. In the foregoing example, a geographic area was defined as corresponding to all the nodes being serviced by the same access point 110. This is intended to be an example of a geographic area, and the present disclosure is not limited thereto. A geographic area can be defined based on any criteria. For example, a geographic area can be defined as the number of nodes communicating through a plurality of access points 110 located in a predetermined proximity to each other. A geographic area can also be defined as nodes communicating with multiple access points 110 being serviced by the same communication station 120 and/or connected to the same backhaul to the communication station 120. In addition, a geographic area can also be defined as any sub-division of a distribution network, such as all nodes located at meters being serviced by one or more substations, transformers and/or feeders of the distribution network. Furthermore, a geographic area can be defined according to any governmental sub-division, such as all nodes located within a particular township, neighborhood, city or zone having a common postal address code, such as a zip code, for example. Accordingly, a geographic area can be defined according to any conceivable criteria.

VIII. Situational Information

In addition to the unique threshold operating information that is recorded in the memory unit 314 for each node in the network 100, the memory unit 314 also has recorded therein situational information that includes data indicative of configured operation data that is expected to be received from nodes in the network 100 during a predetermined time period, based on at least one of a condition and event that is occurring during the predetermined time period. The predetermined time period defined in the situational information can be based on, for example, the time period in which the operation data is expected to be received from a node. If the nodes are configured to report their operation data to the communication station 120 on a more frequent basis, such as once per day, for example, then the operation data measured in the node will likely constitute operation data that was measured contemporaneously with the time at which the operation data is communicated to the communication station 120. Alternatively, if the nodes are configured to report their operation data less frequently, such as once per week, for example, then the predetermined time period defined in the situational information can be based on the time period at which the operation data was measured in the nodes. According to an exemplary embodiment, when communicating their respective operation data to the communication station 120, the nodes are configured to report a precise time at which each portion of the communicated operation data was measured in the node. For example, if a node is configured to report its operation data to the communication station 120 once per week and the operation data contains the amount of a particular commodity consumed during the week, the operation data communicated to the communication station 120 can specify the consumption values measured at any desired time interval, such as the consumption values measured, for example, every hour or every day in the week for which the operation data is communicated to the communication station 120.

As discussed above, the threshold operating information defined for a node in the memory unit 314 is unique for each node based on the respective locational information defined for that particular node. On the other hand, the situational information recorded in the memory unit 314 can be generically defined for two or more nodes such that situational information is commonly defined for multiple nodes in the network 100.

The situational information can define a condition and/or event that is occurring at the time the operation data is received from one or more nodes in the network 100. For example, the situational information can define a current operational state of the distribution network, such as whether there is presently an outage or disruption of service in a portion of the distribution network in the geographical area in which the node(s) is/are located. For instance, if a node is located in a geographic area which is currently experiencing an outage of electricity supply, the situational information can define that the communication station 120 is not expected to receive usage data representing consumption of electricity from any of the nodes in the geographic area experiencing the outage. The situational information can reflect a configuration of the node. For example, if the associated NIC 2 of the utility meter receives its power from the electrical distribution network, an outage in the distribution network could cause the NIC 2 to lose its operating power. In this case, the situational information could define that the number of communications from the node is expected to be zero while the node is experiencing an electrical outage.

Conversely, the situational information could define that the communication station 120 is expected to receive operation data from the nodes in the geographic area experiencing the outage, but that the nodes are not receiving electricity which they are supposed to be receiving, and hence the operation data should indicate a consumption rate of zero during the outage. For example, as described above, a NIC 2 associated with an electric meter can be equipped with a battery as a backup source for power, in the event there is an outage in the electrical distribution network. If one or more nodes in a predetermined geographic area are similarly equipped with a battery as an auxiliary power source, these utility meters 130 can therefore continue to report operation data to the communication station 120 via the utility network 100, even during the electrical outage. In this case, the situational information defined for this geographic area can indicate that the geographic area is experiencing an outage, but that the nodes in the network 100 are still expected to communicate measured operation data, even if the measured operation data represents that the commodity is not presently being consumed due to the outage.

Alternatively, the situational information can define that distribution of a commodity is fully operational and no outages or service disruptions have occurred in the geographical area in which the node(s) is/are located. Such situational information reflects a current operating condition in the distribution network.

The situational information can also define seasonal information at the time the operation data is being received from one or more nodes in the utility network 100. For instance, the situational information can define that the current season is the summertime. Such seasonal information can have an effect on the operation data that is expected to be received from one or more nodes in the utility network 100. For example, in a geographic area in which electricity is supplied to power air conditioners and gas is supplied to operate heating units, it can be expected that electricity consumption values will be comparatively greater in the summer than in the winter, whereas gas consumption values can be expected to be comparatively greater in the winter than in the summer. The situational information can also define current weather conditions. For example, the situational information can define that a current geographical area is currently experiencing increased temperatures relative to historical patterns.

The situational information can also define operational information with respect to one or more nodes in the utility network 100 as well as operational information with respect to the operation of the utility network 100. For example, the situational information can define that the security credentials of one or more neighboring nodes have been compromised. In this case, the situational information can define a limited type of communications that a node can accept from the compromised nodes. For example, in operation, a first node may operate as a relay or a proxy for a second node to transmit the operation data of the second node to an access point 110 in the utility network 100. If it is determined that the security credentials of the second node have been compromised, the communication station 120 can transmit a control command to the first node instructing the first node not to listen for operation data reported by the second node. Instead, the situational information recorded for the first node in the memory unit 314 can indicate that the first node is not permitted to transmit the operation data of the second node to another node in the network 100.

The situational information can be commonly defined for multiple nodes in a predetermined geographic area, and can include any combination of information on conditions and/or events which can have an effect on the operation data which is expected to be received from one or more nodes. For example, the situational information can be any combination of event-, operational-, seasonal and/or weather-based conditions.

The situational information defined and recorded in the memory unit 314 can alter the acceptable operating parameters defined in the threshold operating information for one or more nodes, based on prevailing event-, operational-, seasonal and/or weather-based conditions reflected in the situational information. For example, suppose that the threshold operating information defined for a plurality of nodes in a geographic area includes a respectively unique maximum threshold value of electricity consumption for the month of August. If the geographic area is experiencing a heat wave during August, the maximum threshold values defined in the respective threshold operating information for these nodes can be proportionally increased (e.g., by a factor of 5%) to reflect an increased demand for electricity consumption to power air conditioning units at the premises at which these nodes are located.

Similarly, the situational information recorded in the memory unit 314 can reduce a threshold value defined in the respective threshold operating information of one or more nodes based on an event-, operational-, seasonal and/or weather-based condition. For example, if the threshold operating information of a plurality of nodes in a particular geographic area defines a maximum number of remote connect/disconnects that can be issued against these nodes in a particular season, the maximum number of remote connect/disconnects can be reduced by a proportional or numeric amount (e.g., from five remote connect/disconnects to three remote connect/disconnects) to reflect an expected number of remote disconnect/disconnects based on certain weather conditions.

In the above examples, the situational information and the threshold operating information pertain to the same or similar operation data that are to be received from nodes and monitored in the communication station 120. According to an exemplary embodiment, the situational information can be directed to different operation data than the operation data defined in the threshold operating information. For example, threshold operating information defined for a node can relate to maximum and/or minimum threshold values of consumption of a particular commodity. On the other hand, the situational information can relate to an operational metric such as the number of communications one node is expected to receive from another node in a particular time period. For example, if it is suspected that the security credentials of one or more nodes in a given geographic area have been compromised, the situational information defined for this geographic area can specify a limit on the number of times a first node is expected to receive communications from another node in the geographic area. For example, the situational information defined for the nodes in this geographical area can define a limit on the number of times a first node can act as a relay or a proxy for a second node to forward the operation data of the second node to the communication station 120.

Common situational information can be defined for a plurality of nodes based on any criteria related to the operation of one or more nodes in the utility network 100, the communication functions of the utility network 100, and/or the operation of the distribution network. For example, situational information can be defined for a plurality of nodes based on expected response events from the nodes in a particular season, expected response events based on event-, weather- and/or seasonal-related conditions, expected response events from a number of nodes in a predetermined geographic region, expected response events from nodes communicating through a common communication channel in the utility network 100 (e.g., the nodes are serviced by one or more of the same access points 110), expected response events based on scheduled demand periods, and expected quantities of consumption.

The threshold operating information defined for an individual node or for a predetermined group of nodes in the utility network 100, and the situational information defined for nodes in the utility network 100 are recorded in the memory unit 314. The recorded threshold operating information and/or situational information can be updated in the communication station 120 to accommodate modified operating parameters. For example, an operator of the communication station 120 can update or modify the defined threshold operating information and/or situational information via the user interface of the input unit 330 of the communication station 120. In addition, the control unit 310 can also be configured to automatically alter the threshold operating information and/or situational information defined in the memory unit 314 in response to modified operating parameters of one or more nodes in the utility network 100, the utility network 100, and/or the distribution network. For example, in the event there is an outage in a particular distribution network, the control unit 310 can be configured to automatically modify the threshold operating information defined for one or more nodes as well as the situational information defined for one or more nodes to reflect different operating conditions caused by the outage. When the outage is corrected and distribution of the commodity is resumed, the control unit 310 can be configured to automatically return the altered threshold operating information and situational information to their previous definitions. According to an exemplary embodiment, the control unit 310 can be configured to automatically adjust the threshold operating information and/or situational information by the processor unit 311 executing an application program in which these operations are defined and which is recorded on a computer-readable recording medium of the communication station 120 (e.g., the ROM 312, memory unit 314 and/or memory card/disc inserted into the memory slot 350).

IX. Exemplary Operations of the Control Unit of the Communication Station

Figure 4:
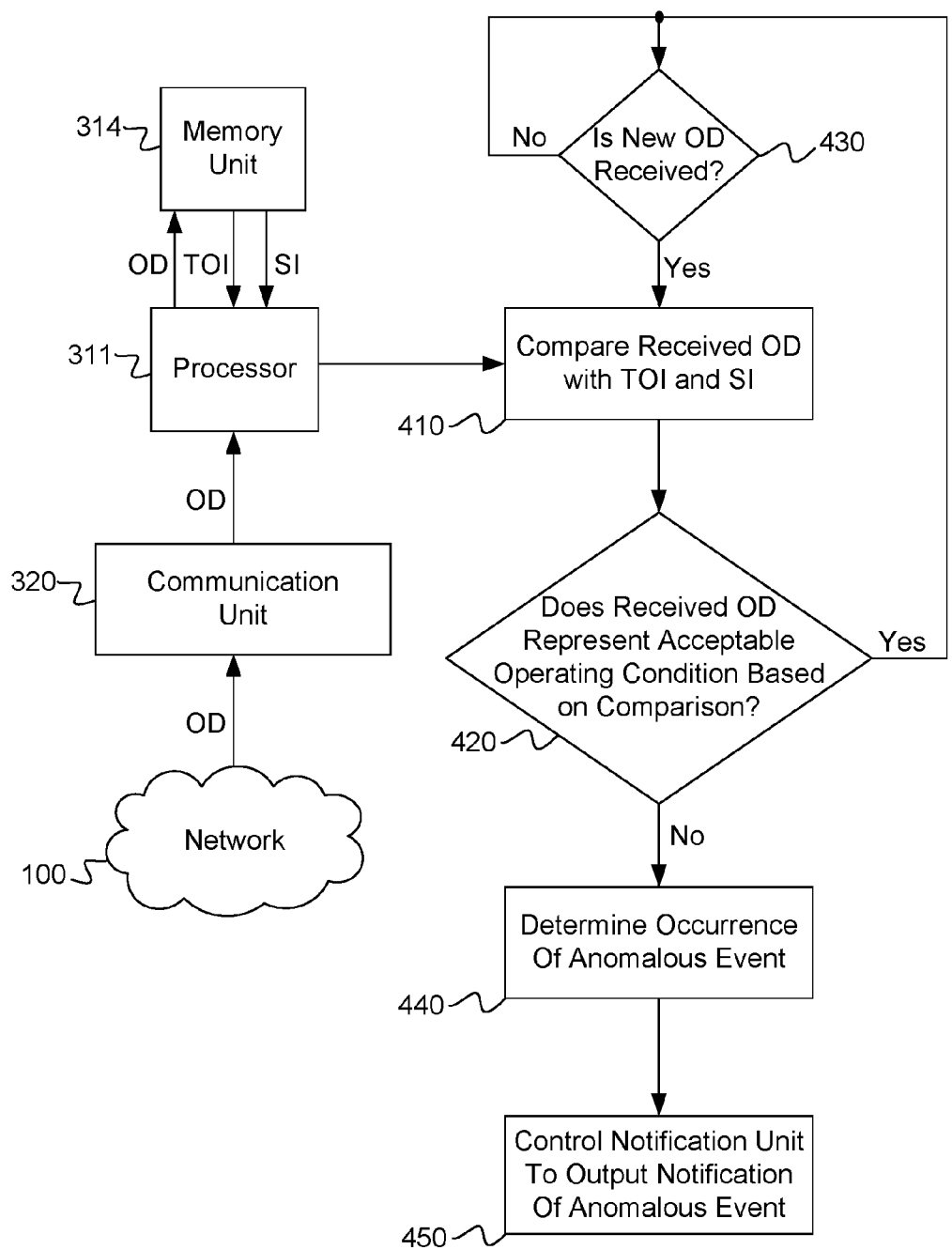
FIG. 4 is an explanatory diagram illustrating exemplary operations performed by a control unit of the communication station in detecting whether an anomalous event has occurred in connection with one or more nodes in the utility network.

FIG. 4 is an explanatory diagram illustrating exemplary operations performed by the control unit 310 of the communication station 120 in detecting whether an anomalous event has occurred in connection with one or more nodes in the utility network 100. As described above, unique threshold operating information is defined and recorded in the memory unit 314 for the nodes in the utility network 100. The threshold operating information includes data indicative of configured acceptable operating parameters of the nodes in the utility network 100 based on respective locational information of the nodes in the utility network 100. In addition, the memory unit 314 also has situational information defined and recorded therein for the nodes in the utility network 100. The situational information includes configured operation data (OD) that is expected to be received from one or more nodes in the utility network 100 during a predetermined time period, based on at least one of a condition and event that is occurring during the predetermined time period.

As illustrated in FIG. 4, the communication unit 320 receives operation data from one or more nodes in the utility network 100. The nodes can be configured to transmit their respective operation data to the communication station 120 at predetermined time intervals (e.g., hourly, once a week, etc.). Alternatively or in addition, the control unit 310 can cause the communication unit 320 to transmit a command instruction to a particular node, which, if it is currently operational, will transmit its operation data to the communication station 120 upon receipt of the command instruction.

For clarity of illustration, the exemplary embodiment of FIG. 4 will be initially described with respect to an example where the communication station 120 receives operation data from a single node in the utility network 100. However, it is to be understood that the communication station 120 can receive operation data from a plurality of nodes at any point in time and individually process the operation data received from the plurality of nodes in parallel. Upon receipt of the operation data from a node, the communication unit 320 forwards the received operation data to the reception unit 315, which in turn forwards the received operation data to the processor unit 311. The reception unit 315 can function as a buffer for received operation data, and can transmit specific received operation data to the processor unit 311 according to various buffering techniques. For example, the reception unit 315 can operate as a first-in first-out (FIFO) buffer in which the reception unit 315 transmits received operation data to the processor unit 311 in the order in which the operation data is received. Alternatively, the reception unit 315 can detect whether certain operation data is to be prioritized, and transmit operation data having a higher priority to the processor unit 311 before transmitting operation data having a lower priority. For example, the nodes in the utility network 100 can be configured to define a priority designation in the operation data, and the reception unit 315 can appropriately transmit the operation data to the processor unit 311 in accordance with the priority designation defined in the received operation data. Alternatively or in addition, the reception unit 315 can be programmed to interpret the operating parameters of the node that are included in the received operation data, and assign a higher priority to specific operating parameters that may require more immediate processing by the processor unit 311. For example, the nodes in the utility network 100, when generating their respective operation data, can be configured to include an alert message (e.g., an alert flag) in the packet(s) transmitted to the communication station 120, and the reception unit 315 can be programmed to prioritize forwarding of operation data received with an alert message over operation data not received with an alert message to the processor unit 311.

Upon receiving operation data from the node, the processor unit 311 accesses the memory unit 314 to obtain the threshold operating information (TOI) and situational information (SI) that are defined for that node. The processor unit 311 also causes the memory unit 314 to store the operation data received from the node.

As illustrated in operation 410 of FIG. 4, the processor unit 311 then compares the received operation data with the obtained threshold operating information and with the obtained situational information defined for that node. In operation 420, the processor unit 311 determines whether the received operation data represents an acceptable operating condition for the node based on the comparison of the operation data with the threshold operating information and the situational information defined for the node. If the operation data received from the node represents an acceptable operating condition based on the comparison of the received operation data with the threshold operating information and the situational information defined for the node, the processor unit 311 next performs operation 430, in which the processor waits to receive new operating data from a node in the utility network 100.

On the other hand, if the operation data received from the node does not represent an acceptable operating condition for the node based on the comparison of the operation data with the threshold operating information and the situational information defined for the node, the processor unit 311 performs operation 440, in which the processor 440 determines that an anomalous event has occurred with respect to the node. Based on this determination, the processor unit 311 then performs operation 450, in which the processor unit 311 controls the notification unit 340 to output notification of the detected anomalous event. The processor unit 311 can also control the memory unit 314 to record the notification in association with the node for which the anomalous event was detected.

The notification outputted by the notification unit 340 can identify the node for which the anomalous event has occurred, a description of the anomalous event, and the time and date that the operation data was received from the node. The notification outputted by the notification unit 340 enables an operator of the communication station 120 to recognize the existence of the anomalous event contemporaneously with the detection of the anomalous event. Upon receiving the notification, the operator of the communication station 120 can implement various corrective measures. For example, the operator of the communication station 120 can shift loads away from one or more premises associated with the nodes for which an anomalous event was detected, isolate the affected nodes from being able to communicate with other nodes in the utility network 100, impose restrictions on the operations that an affected node can perform, conduct an investigation to determine the cause of the anomalous event, and dispatch a service technician to institute corrective measures to resolve the anomalous event. In addition, since notification of the anomalous event is reported at the time the anomalous event is detected, inaccurate operation data, such as commodity consumption values, for example, and any resultant loss in revenue for the malfunctioning node can be minimized. For example, upon being notified of the anomalous event, the operator of the communication station 120 can initiate an investigation into the cause of the anomalous event and respond with appropriate action.

Figure 5A:
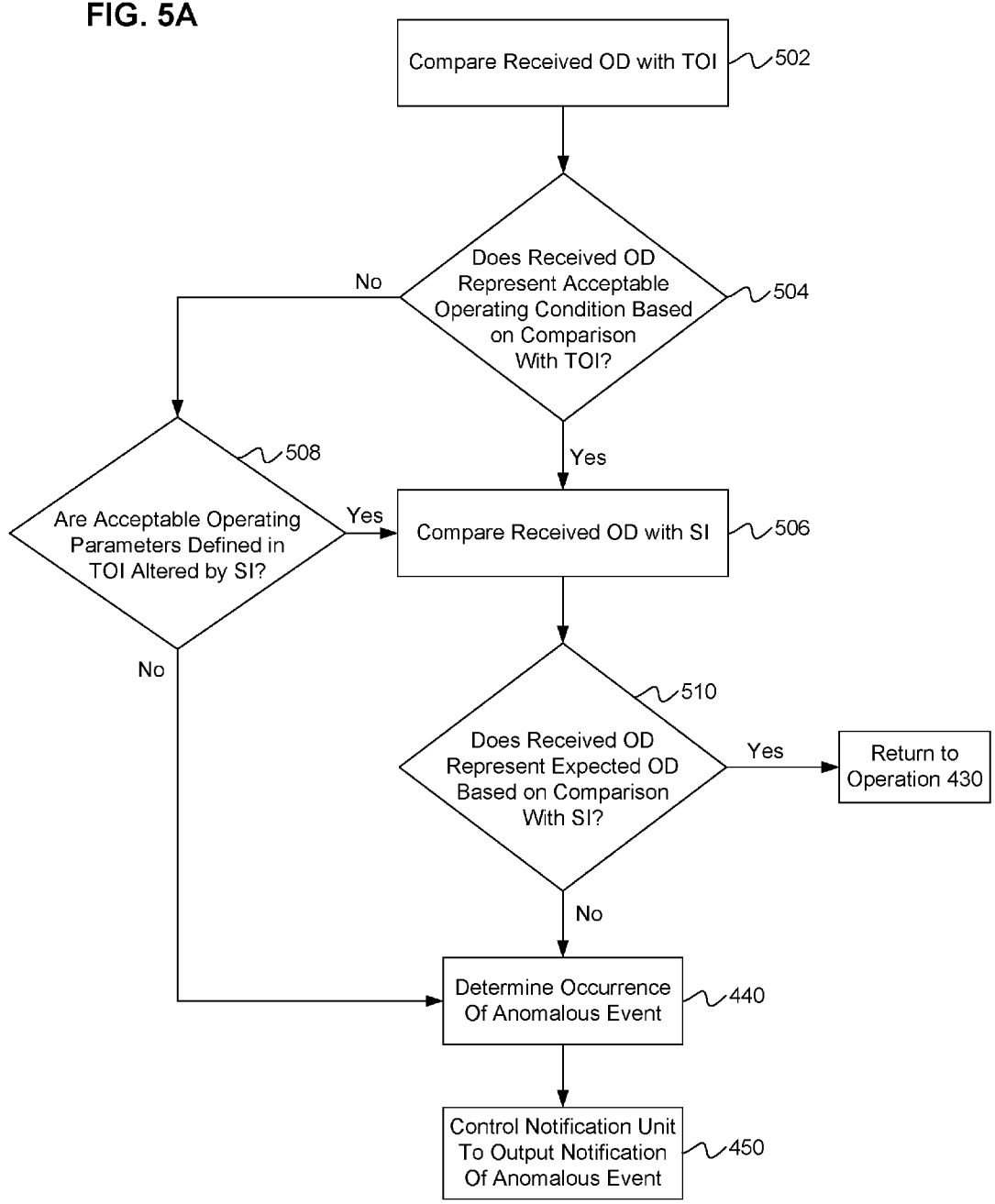
FIGS. 5A-5C respectively illustrate three exemplary embodiments of the configuration of the control unit of the communication station in detecting whether an anomalous event has occurred with respect to a node based on a comparison of operation data received from the node with threshold operating information and situational information defined and recorded for the node in a memory unit of the communication station.
Figure 5B:
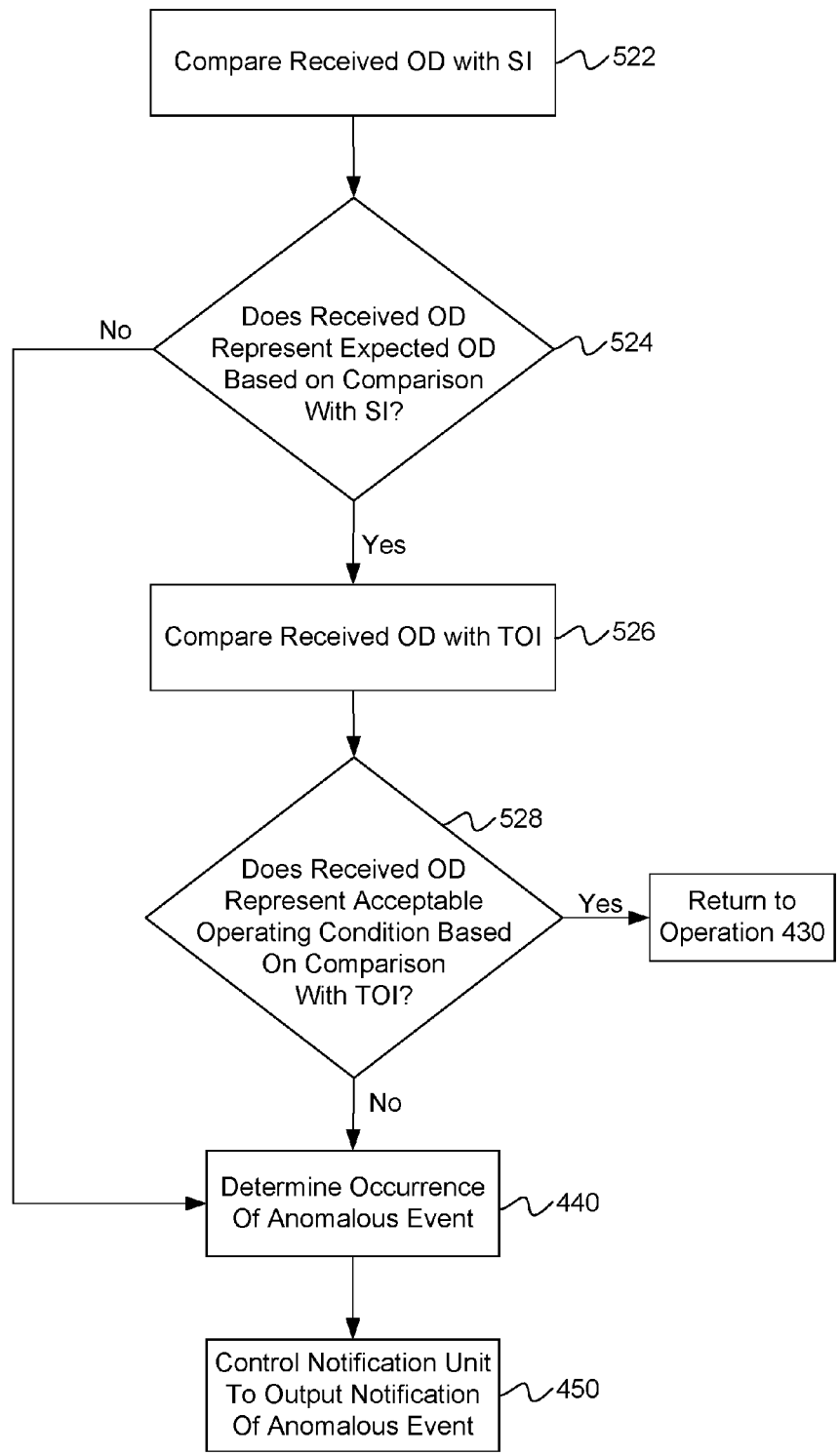
Figure 5C:
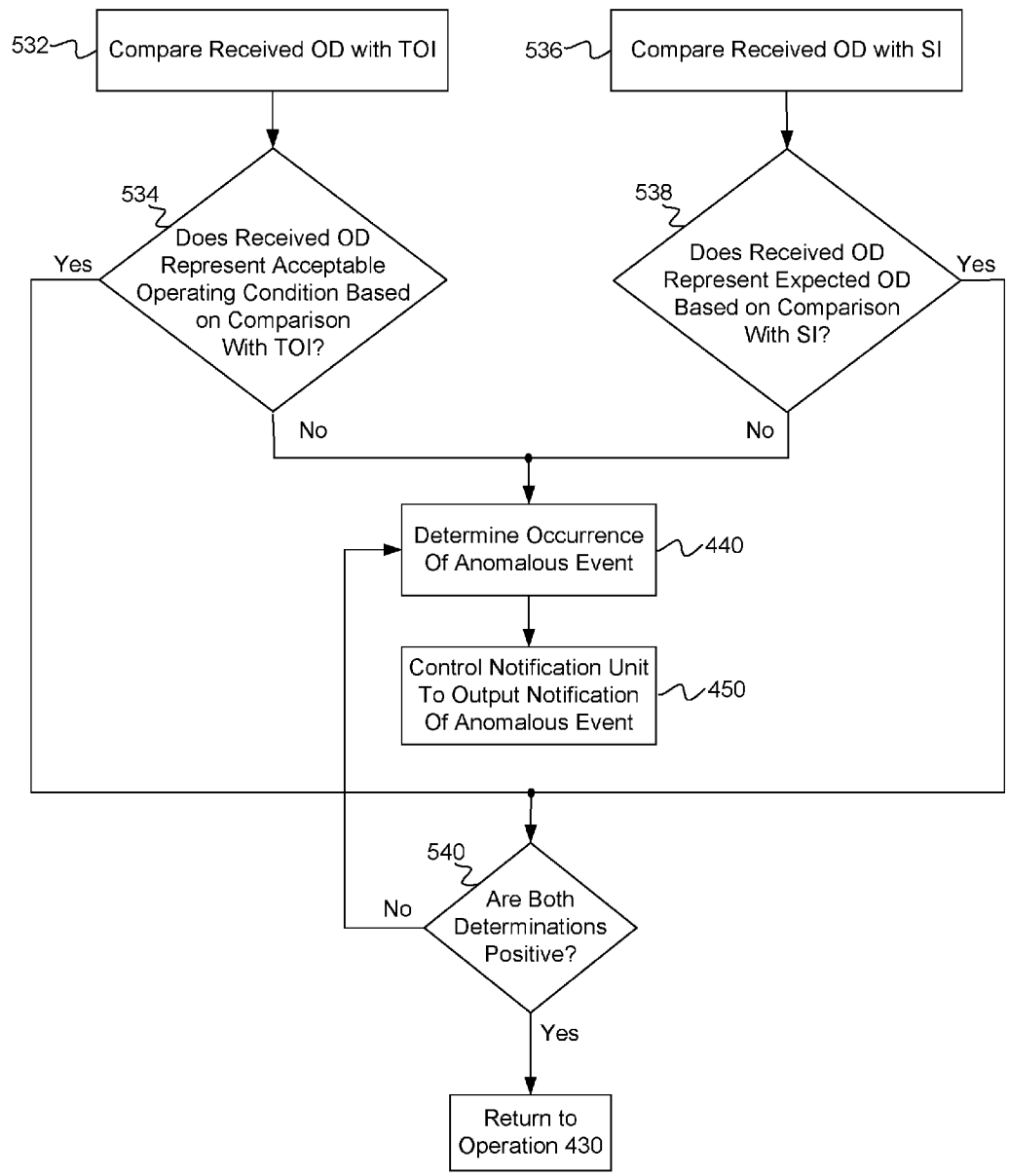

FIGS. 5A-5C respectively illustrate three exemplary embodiments of the configuration of the processor unit 311 in comparing the operation data received from a node with the threshold operating information and the situational information defined and recorded in the memory unit 314 for the node. For clarity of illustration, the configuration of the processor unit 311 is described in terms of various processing operations. For example, the processor unit 311 can be configured to perform the illustrated operations by executing an operating system and/or application program recorded in a computer-readable recording medium of the communication station 120.

In operation 502 of the exemplary embodiment of FIG. 5A, the processor unit 311 first compares the operation data received from a node with the threshold operating information defined and recorded for that node in the memory unit 314. In operation 504, the processor unit 311 determines whether the received operation data represents an acceptable operating condition for the node based on the comparison of the received operation data with the threshold operating information defined for that node.

If, in operation 504, the processor unit 311 determines that the received operation data represents an acceptable operating condition for the node, the processor unit 311 then performs operation 506. In operation 506, the processor unit 311 compares the received operation data with the situational information defined and recorded for the node in the memory unit 314. In operation 510, the processor unit 311 determines whether the received operation data represents operation data that is expected to be received from nodes in the utility network 100 during a predetermined time period in which the operation data is received, based on the comparison of the received operation data with the situational information defined for that node. For example, if situational information indicating operation data that is expected to be received during the month of January is defined in the memory unit 314 for all nodes in a predetermined geographic area of which the transmitting node is a member, then the processor unit 311 compares the operation data received from this node to determine if it represents the operation data that is expected to be received from the group of nodes in the month of the January. If the operation data received from the node represents operation data that is expected to be received from the node during the time period in which the operation data is expected to be received, the processor unit 311 proceeds to perform the above-described operation 430 in which the processor waits for the next operation data to be received.

On the other hand, if in operation 510, the processor unit 311 determines that the received operation data does not represent operation data that is expected to be received, based on the comparison of the received operation data with the situational information defined for that node, then the processor unit 311 proceeds to perform the above-described operations 440 and 450 in succession.

If the processor unit 311, in operation 504, does not determine that the received operation data represents an acceptable operating condition for the node based on the comparison of the received operation data with the threshold operating information defined for that node, the processor unit 311 then performs operation 508. In operation 508, the processor unit 311 determines whether the acceptable operating parameters defined in the threshold operating information for the node have been altered in the situational information defined for the node. As described above, the situational information defined and recorded in the memory unit 314 can alter the acceptable operating parameters defined in the threshold operating information for one or more nodes, based on prevailing event-, operational-, seasonal and/or weather-based conditions reflected in the situational information. For example, suppose that the threshold operating information defined for a node in a geographic area includes a maximum threshold value of electricity consumption for each day in the month of August. If the geographic area is experiencing a heat wave during August, the maximum threshold values defined in the respective threshold operating information for these nodes can be proportionally increased (e.g., by a factor of 5%) in the situational information defined for the nodes in this geographic area to reflect an increased demand for electricity consumption to power air conditioning units at the premises at which these nodes are located.

In accordance with the exemplary embodiment of FIG. 5A, suppose that threshold operating information recorded in the memory unit 314 for a node in a particular geographic area includes a maximum threshold value of 40 kWh per day of electricity consumption for the premises at that node. If the geographic area is experiencing a heat wave, situational information can be defined and recorded in the memory unit 314 for those nodes in the geographic area to increase the maximum threshold value of daily electricity consumption by 5% during the heat wave. In this case, the situational information defined for the node can indicate a maximum threshold value of 42 kWh of electricity consumption for the premises at that node during the heat wave. In this example, suppose that the node transmits operation data to the communication station 120 that indicates a total consumption value of 41 kWh in a day during the heat wave. Upon receiving this operation data from the node, the processor unit 311 will determine in operation 504 that the operation data received from the node does not represent an acceptable operating condition based on the comparison of the received operation data with the threshold operating information defined for that node. Based on this negative determination in operation 504, the processor unit 311 will next perform operation 508. In this example, the processor unit 311 will determine in operation 508 that the received operation data indicating a total daily consumption value of 41 kWh does not represent an acceptable operating condition, because the total daily consumption value of 41 kWh exceeds the maximum daily threshold value of 40 kWh defined in the threshold operating information for that node. However, in this example, the processor unit 311 determines in operation 508 that the acceptable operating parameters defined in the threshold operating information for the node have been altered by the situational information defined for the node. Based on this positive determination in operation 508, the processor unit 311 will next proceed to perform the above-described operation 506, in which the processor unit 311 compares the operation data received from the node with the situational information defined for the node. In this example, the processor unit 311 will then determine in operation 510 that the received operation data indicating a total consumption value of 41 kWh represents operation data that is expected to be received from the node during the heat wave, because the total daily consumption value of 41 kWh included in the operation data measured during the heat wave is less than the threshold daily maximum consumption value of 42 kWh included in the situational information that is defined for the node during the heat wave. Based on this determination in operation 510, the processor unit 311 then proceeds to operation 430 in which the processor unit 311 waits to receive new operation data from a node in the utility network 100.

If the processor unit 311 determines in operation 508 that the operating parameters defined in the threshold operating information for the node from which the operation data was received have not been altered by the situational information defined for the node, then the processor unit 311 proceeds to successively perform the above-described operations 440 and 450. For example, if the threshold operating information and the situational information defined for the node are respectively directed to different operational metrics having no dependent relationship on each other, then the processor unit 311 will make a negative determination in operation 508.

According to an exemplary embodiment of the present disclosure, the processor unit 311 determines that an anomalous event has occurred with respect to one or more nodes if the operation data received from a node does not comport with either the acceptable operating conditions defined in the threshold operating information for the node or the definition in the situational information of operation data that is expected to be received from the node. Accordingly, the exemplary embodiment of FIG. 5A provides an advantageous mechanism to determine whether the threshold operating information and situational information recorded for a node define different acceptable operating parameters based on the same or similar operational metric to be monitored in the communication station 120.

FIG. 5B illustrates another exemplary embodiment of the processing operations performed by the processor unit 311 in determining whether an anomalous event has occurred with respect to one or more nodes in the utility network 100. As an alternative to the exemplary embodiment of FIG. 5A, the processor unit 311, in operation 522, first compares the operation data received from a node with the situational information defined for the node. In operation 524, the processor unit 311 determines whether the received operation data represents operation data that is expected to be received from nodes in the utility network 100 during a predetermined time period in which the operation data is received, based on the comparison in operation 522 of the received operation data with the situational information defined for that node. If, based on the comparison of the received operation data with the situational information defined for the node, the processor unit 311 positively determines that the operation data received from the node represents operation data that is expected to be received from the node during the time period in which the operation data is expected to be received, the processor unit 311 then proceeds to perform operation 526. In operation 526, the processor unit 311 compares the operation data received from the node with the threshold operating information defined and recorded for that node in the memory unit 314. Next, in operation 528, the processor unit 311 determines whether the received operation data represents an acceptable operating condition for the node based on the comparison of the received operation data with the threshold operating information defined for that node. If the processor unit 311 determines in operation 528 that the received operation data represents an acceptable operating condition based on the comparison of the received operation data with the threshold operating information defined for that node, the processor unit 311 then proceeds to perform operation 430 in which the processor unit 311 waits for reception of new operation data from the node in the utility network 100.

On the other hand, if the processor unit 311 determines in operation 528 that the received operation data does not represent an acceptable operating condition based on the comparison of the received operation data with the threshold operating information defined for that node, the processor unit 311 then successively performs the above-described operations 440 and 450.

According to the exemplary embodiment of FIG. 5B, the processor unit 311 can determine if the received operation data represents an anomalous event if the determination in operation 524 is negative. In particular, based on the comparison in operation 522 of the received operation data with the situational information defined for the node, if the processor unit 311 determines in operation 524 that the received operation data does not represent operation data that is expected to be received in the predetermined time period defined in the situational information, then the processor unit 311 can bypass operations 526 and 528. This exemplary configuration of the processor unit 311 can reduce the processing operations of the processor unit 311 to determine if an anomalous event has occurred with respect to one or more nodes in the utility network 100. This exemplary configuration is particularly advantageous if common situational information is defined for a plurality of nodes, and the situational information is deemed to have greater significance in determining whether an anomalous event has occurred. For example, suppose that the situational information defined for a plurality of nodes in a particular geographic area specifies expected total consumption values for both electricity and gas consumption in the nodes located in the geographic area. If the operation data received from one or more nodes in the geographic area indicates gas consumption values but no consumption of electricity, then the processor unit 311 can determine, based on the comparison of the received operation data with the situational information defining both expected gas and electrical consumption values, that an anomalous event has occurred, such as an outage with the electrical distribution network.

FIG. 5C illustrates an exemplary embodiment in which the processor unit 311 is configured to compare, in parallel, the operation data received from a node with the threshold operating information, and compare the operation data with the situation information defined for the node. With reference to FIG. 5C, in operation 532, the processor unit 311 compares the operation data received from the node with the threshold operating information defined for the node, and determines in operation 534 whether the received operation data represents an acceptable operating condition of the node, based on the comparison of the received operation data with the threshold operating information defined for the node. In addition, in operation 536, the processor unit 311 compares the received operation data with the situational information defined for the node, and determines in operation 538 whether the received operation data represents operation data that is expected to be received in the predetermined time period defined in the situational information, based on the comparison of the received operation data with the situational information defined for the node.

In the exemplary embodiment of FIG. 5C, the separate comparison and resultant determination operations can be performed at the same time, or one after the other. As illustrated in FIG. 5C, if there is a negative determination (i.e., "No") in either operation 534 or operation 538, the processor unit 311 proceeds to perform the above-described operations 440 and 450 in succession.

If there is a positive determination (i.e., "Yes") in either operation 534 or operation 538, the processor unit 311 proceeds to operation 540. In operation 540, the processor unit 311 determines whether the determination results in both operation 534 and operation 538 are positive. If the processor unit 311 determines that the determination results in both operations 534 and 538 are positive, the processor unit 311 proceeds to perform operation 430 in which the processor unit 311 waits for reception of new operation data from a node in the utility network 100. If either of the determination results in operations 534 and 538 are negative, the processor unit 311 proceeds to perform the above-described operations 440 and 450 in succession. Accordingly, in the exemplary embodiment of FIG. 5C, the processing unit 311 determines that an anomalous event has occurred if the determination result of either operation 534 or operation 538 is negative.

The processing unit 311 can be configured to perform the processing operations according to the exemplary embodiment of FIG. 5C if, for example, the threshold operating information and situational information defined for a node are respectively directed to different operating parameters to be monitored in the communication station 120. For example, if the threshold operating information recorded in the memory unit 314 for a node defines a maximum number of demand response events that can be issued against the meter 130 of the node, and the situational information defined for the node is directed to a maximum number of communications that the node is expected to receive from another node in the utility network 100, received operation data can be compared to the threshold operating information and situational information directed to distinct operational metrics in parallel, because the threshold operating information and situational information defined for the node are not dependent on each other.

In view of the above-described exemplary embodiments, various examples of threshold operating information, locational information and situational information are described below to illustrate different types of operating parameters of nodes that can be monitored by the communication station 120 to detect whether an anomalous event has occurred with respect to one or more nodes in the utility network 100. The following examples illustrate exemplary embodiments of detecting whether an anomalous event has occurred with respect to one or more nodes in the utility network 100. The present disclosure is not limited to the specific examples described below.

Figure 6:
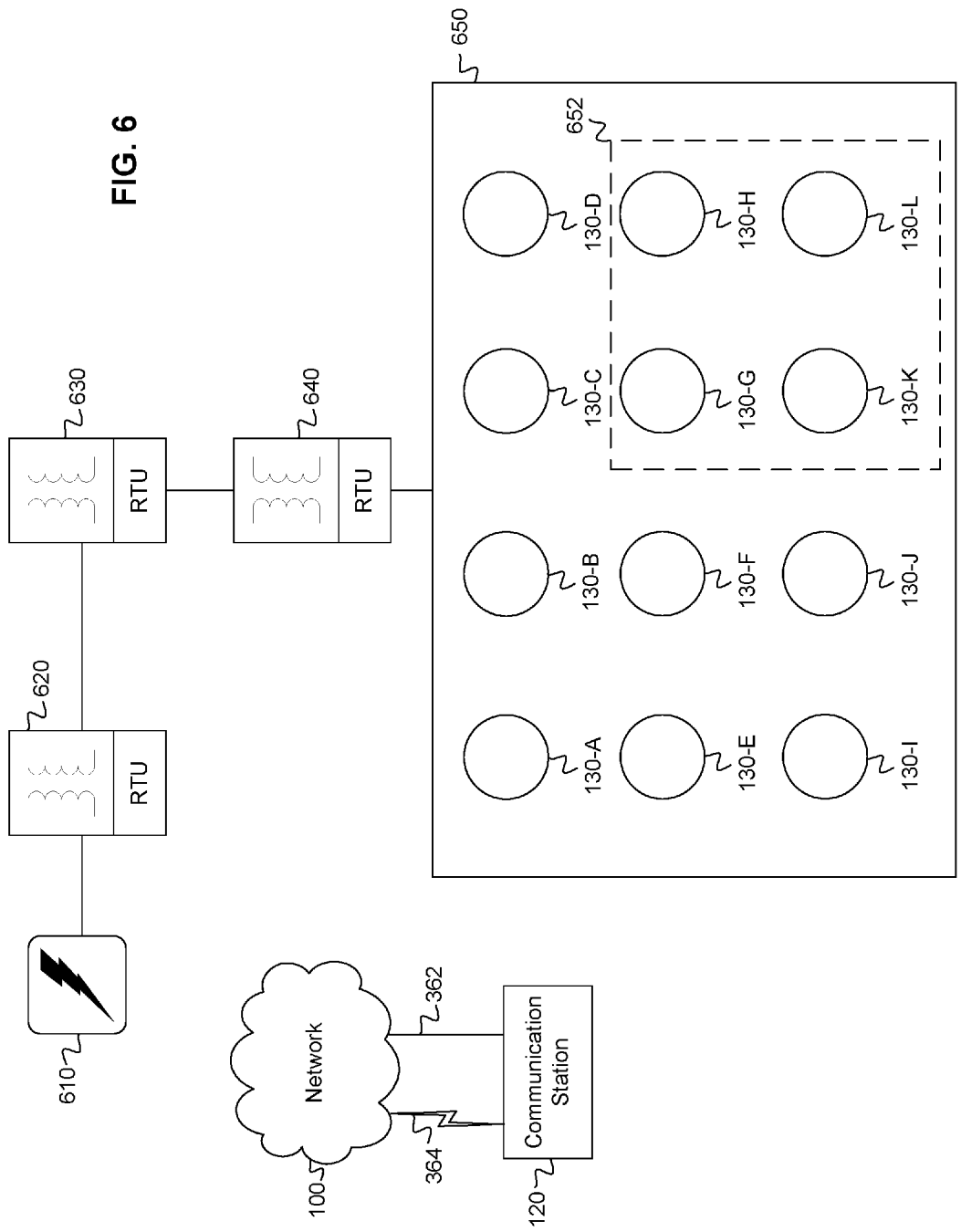
FIG. 6 illustrates an example of an electrical distribution network operating in conjunction with a utility network, in which features of the present disclosure can be implemented.

FIG. 6 illustrates an example of an electrical distribution network operating in conjunction with the utility network 100, in which exemplary embodiments of the present disclosure can be implemented. Reference numeral 610 denotes a power plant which produces the electrical power to be distributed and consumed in the distribution network. Reference numeral 620 denotes a transmission substation 620 which is configured to step down the voltage of the electrical commodity generated at the power plant 610. Reference numeral 630 denotes a power substation which is configured to further step down the voltage of the electrical commodity beyond the voltage reduction implemented in the transmission substation 620. Reference numeral 640 denotes a transformer which is configured to further step down the voltage of the electrical commodity and condition the electrical commodity for consumption at premises being serviced by the transformer 640. For example, the transformer 640 can be configured to process the electrical commodity to provide single-phase 120V AC service to the premises served by the transformer 640.

In the exemplary embodiment of FIG. 6, the transmission substation 620, power substation 630 and transformer 640 are each equipped with an RTU that can measure operation data (e.g., operational metrics data and threshold operation settings) of the associated distribution devices 620, 630, 640 and communicate the measured operation data to the communication station 120 via the utility network 100. As described above, a NIC 2 associated with the RTU can communicate the measured operation data to the communication station 120 of the utility provider. An RTU having an associated NIC 2 is an example of a node in the exemplary utility network 100. Accordingly, as used herein, any reference to a utility meter 620, 630, 640 is intended to encompass an RTU having a NIC 2 associated with the RTU of the distribution device. By being equipped with the RTU and associated NIC 2, the distribution devices 620, 630 and 640 of the distribution network can therefore monitor operating parameters (e.g., usage data, operational metrics data, threshold operation settings, etc.) of the NIC 2 and/or the RTU with which the NIC 2 is associated, generate operation data representing the monitored operating parameters, transmit the generated operation data to the communication station 120 via one or more other nodes in the utility network 100, and receive control instructions as well as other data pertaining to the operating parameters of the meters 620, 630, 640 and other nodes in the utility network 100.

Furthermore, as described above, the utility meters 130 illustrated in FIG. 6 are also each equipped with a NIC 2 to enable the meters 130 to measure operation data from the NIC 2 and/or the meter with which the NIC 2 is associated, communicate the measured operation data to the communication station 120 via one or more other nodes in the utility network 100, and receive control instructions as well as other data pertaining to the operating parameters of the meter 130 and other nodes in the utility network 100.

To be clear, the meters 130, 620, 630, 640 are comprised within the utility network 100. However, for clarity of illustration, the utility network 100 is shown in FIG. 6 as a communication medium through which the nodes 130, 620, 630 and 640 of the utility network 100 can communicate with the communication station 120 of the utility provider.

In the exemplary embodiment of FIG. 6, twelve meters 130-A to 130-L are illustrated as being in a predetermined geographic area 650. In this example, the geographic area 650 is defined as the number of meters 130 being serviced by a common distribution device of the distribution network, such as the transformer 640.

Each of the nodes 130, 620, 630, 640 has unique threshold operating information defined and recorded in the memory unit 314 of the communication station 120, based on respectively unique locational information of each of these nodes. In addition, situational information is defined and recorded in the memory unit 314 for the nodes 130, 620, 630, 640. As described above, common situational information can be defined for a plurality of nodes in the utility network 100. For example, common situational information can be defined and recorded in the memory unit 314 for a plurality of the meters 130, and common situational information can be defined and recorded in the memory unit 314 for a plurality of the meters 620, 630 and 640.

The utility network 100 enables the communication station 120 to issue remote connect/disconnects against one or more meters 130, 620, 630 and 640 in the distribution network, to remotely connect and/or disconnect the meters 130, 620, 630 and 640 to/from a portion of the distribution network. For example, based on locational information indicating that nodes 130-A and 130-F are rental properties, threshold operating information can be defined and recorded in the memory unit 314 to include an increased maximum threshold value of remote connect/disconnects relative to the other nodes 130 in the geographic area 650, based on the respective unique locational information defined for the nodes 130 in the geographic area 650. Suppose, for example, that threshold operating information defined for node 130-A indicates a maximum threshold number of four remote connect/disconnects per month. This threshold value is based on locational information which indicates that the node 130-A is located at a rental property near the beach which is commonly rented in weekly increments. Based on this locational information, the threshold operating information recorded in the memory unit 314 for node 130-A is defined to include a maximum threshold value of four remote connect/disconnects per month, which reflects that a remote disconnect/connect could be issued to the meter 130-A by the communication station 120 after each weekly rental period.

In this example of the weekly rental property at node 130-A, suppose that the situational information is not related to a maximum or minimum threshold value for the number of remote connect/disconnects that can be issued against the meters 130 in the geographic area. Rather, common situational information is defined for nodes 130 in the geographic area 650 to indicate that the geographic area is currently experiencing a heat wave, and as such, the maximum daily threshold consumption values for each of the nodes 130 are increased by a factor of 5%. In this example, suppose that the communication station 120 receives operation data from the node 130-A indicating that a total of six remote disconnect/connects have been issued against the meter 130-A in a month. In accordance with the exemplary embodiments of FIGS. 4 and 5A-5C, the processing unit 311 of the communication station 120 will compare the operation data received from the node 130-A with the threshold operating information and situational information defined for the node 130-A. In this example, the situational information defined for nodes 130 does not pertain to an acceptable number of remote connect/disconnects that can be issued against the meters 130. Consequently, the comparison of the received operation data of node 130-A indicating a total number of six remote connect/disconnects is not incompatible with the situational information defined for nodes 130. However, the total number of six remote connect/disconnects included in the operation data received from the node 130-A exceeds the maximum number of remote connect/disconnects defined in the threshold operating information for the node 130-A. Consequently, the processing unit 311 will determine that the operation data received from the node 130-A does not represent an acceptable operating parameter, based on the comparison of the received operation data with the threshold operating information defined for the node 130-A.

Now, suppose that the situational information defined for nodes 130 is related to a maximum number of remote connect/disconnects in a given month. For example, suppose that the month is February, and the weekly seaside rental property at which node 103-A is located, is rented infrequently in the winter months, such as once per month. The other rental property in the geographic area 650 at which node 130-F is located is an apartment that is rented in monthly increments. In view of this information, the situational information defined for nodes 130 in the geographic area 650 indicates a maximum threshold value of two remote connect/disconnects per month. Suppose that the node 103-A transmits to the communication station 120 measured operation data indicating a total number of four remote connect/disconnects in the month of February. Upon receiving this operation data from the node 103-A, the processing unit 311 will compare it with the threshold operating information and the situational information defined for the node 103-A. As described above, the threshold operating information defined for node 103-A is defined in this example to include a maximum threshold value of four remote connect/disconnects per month. Since the number of four remote connect/disconnects per month included in the operation data received from the node 130-A comports with the threshold value of four remote connect/disconnects per month as defined in the threshold operating information for the node 130-A, the processing unit 311 can determine that the received operating data represents an acceptable operating condition with respect to node 130-A.

However, the total number of four remote connect/disconnects per month included in the operation data received from the node 130-A exceeds the maximum threshold value of remote connect/disconnects per month included in the situational information for the nodes 130 in the geographic area 650. Consequently, based on this comparison, the processing unit 311 will determine that an excessive number of remote connect/disconnects have been issued against the meter 130-A, and will resultantly determine that an anomalous event has occurred with respect to node 103-A in the month of February. Based on this determination, the processing unit 311 will control the notification unit 340 to output notification of the determined anomalous event.

Accordingly, the communication station 120 can determine that an anomalous event has occurred when an excessive number of remote connect/disconnects are issued against the same meter in a predetermined time period.

In another example, the communication 120 can determine whether remote connect/disconnects are issued to an excessive number of nodes in a particular geographic area during a predetermined time period. Since the processing unit 311 records each operation data received from a node in the memory unit 314, the processing unit 311 can aggregate the operation data received from a number of nodes to determine whether a specific event has occurred with respect to the number of nodes in a predetermined geographic area. For example, with reference to FIG. 6, suppose that the communication station 120 has determined that remote connect/disconnects have been issued with respect to nodes 130-G, 130-H, 130-K and 130-L in the month of February, based on respective operation data received from these nodes. The respective number of remote connect/disconnects issued to nodes 130-G, 130-H, 130-K and 130-L in the month of February may not be indicative of individual anomalous events with respect to these individual nodes.

However, when remote connect/disconnects are issued to a number of nodes in a predetermined geographic area within a specified time period, it could be indicative of an anomalous event occurring in that geographic area. As illustrated with the dotted line in FIG. 6, the nodes 130-G, 130-H, 130-K and 130-L are commonly located in a sub-section 652 of the geographic area 650. To monitor such events, situational information can be defined for a particular geographic area (e.g., geographic area 650, geographic area 652) to include a maximum threshold number of remote connect/disconnects that can be issued to a number of nodes in a particular geographic area. For example, suppose that situational information is defined in the memory unit 314 to indicate that a maximum threshold number of four remote connect/disconnects can be issued to any combination of nodes 130-G, 130-H, 130-K and 130-L in the geographic area 652 in a month. Suppose further, for the sake of simplicity, that the respective threshold operating information for each of nodes 130-G, 130-H, 130-K and 130-L includes a maximum threshold value of two remote connect/disconnects per month. Suppose that the operation data received from node 130-G indicates that two remote connect/disconnects have been issued against the premises associated with node 130-G in the month, the operation data received from node 130-H indicates that one remote connect/disconnect has been issued against node 130-H in the month, the operation data received from node 130-K indicates that two remote connect/disconnects have been issued against node 130-K in the month, and the operation data received from node 130-L indicates that one remote connect/disconnect has been issued against node 130-L.

Accordingly, in this example, a total number of six remote connect/disconnects have been issued against nodes 130-G, 130-H, 130-K and 130-L in the month. Based on their respective threshold operating information indicating a threshold maximum value of two remote connect/disconnects per month, the processing unit 311 will not determine that the nodes 130-G, 130-H, 130-K and 130-L have individually exceeded the maximum threshold value of remote connect/disconnects defined in their respective threshold operating information. However, the total number of remote connect/disconnects received for the nodes 130-G, 130-H, 130-K and 130-L in the geographic area 652 exceeds the maximum threshold value of remote connect/disconnects that can be issued against any combination of nodes located in geographic area 652. Accordingly, by aggregating the operation data received from the nodes 130-G, 130-H, 130-K and 130-L in geographic area 652 and comparing the aggregated operating data with the situational information defined for any node in the geographic area 652, the processor unit 311 can determine the occurrence of an anomalous event when remote connect/disconnects are issued to an excessive number of nodes in a particular geographic area during a predetermined time period.

Similarly, in view of the foregoing examples, the communication station 120 can also determine whether an excessive number of remote connect/disconnects are issued against an excessive number of nodes in a particular geographic area during a predetermined time period. For instance, the communication station 120 can determine whether an excessive number of remote connect/disconnects are issued against an individual node in the geographic area, and then aggregate the determinations based on the individual nodes in the geographic area to determine whether an excessive number of remote connect/disconnects have been issued against an excessive number of nodes in the geographic area during a predetermined time period.

According to another example, the communication station 120 can also determine whether the order of requested commands received from a node is indicative of an anomalous event. For example, if a meter associated with a node has been remotely disconnected by the communication station 120, the threshold operating information defined and recorded for that node in the memory unit 314 can include a designation that the node is currently disconnected from receiving the commodity supplied by a distribution network. As described above, the locational information defined for a node can include connection information indicating whether the node is currently connected or disconnected from the distribution network to receive the commodity supplied by the distribution network. Based on this locational information, the threshold operating information defined for the node in the memory unit 314 can specify an order of requested commands that are acceptable to be received from the node. If the threshold operating information defined for the node indicates the current connection state of the node to the distribution network, the processing unit 311 can determine whether the order of requested commands received in the operation data from the node constitute an anomalous event. Furthermore, situational information can be defined for one or more nodes to indicate a maximum threshold value of connect or disconnect commands received from the node. In accordance with the above-described exemplary embodiments of FIGS. 4 and 5A-5C, the processing unit 311 can compare the operation data received from the node with the threshold operating information and situational information defined for that node to determine if an anomalous event has occurred with respect to the order of requested commands from the node. For example, if a sequence of repetitive connects and disconnects are received from the same node, the processing unit 311 can compare the received connect/disconnect requests with the threshold operating information and situational information of the node to determine whether an anomalous even has occurred. In addition, if disconnects are issued to nodes that are not currently connected, or if remote connection requests are received from a node that is already connected, the processing unit 311 can compare the received connect/disconnect requests with the threshold operating information and situational information of the node to determine whether an anomalous even has occurred.

According to another example, suppose that a particular geographic area is experiencing an electrical outage. With reference to FIG. 6, the geographic area can be defined as the number of nodes 130 being serviced by the same transformer 640. If, in this geographic area 650, node 130-A communicates operation data to the communication station 120 indicating that power has been restored to the meter 130-A, while none of the other nodes 130 in the geographic area 650 have similarly reported restoration of power, the processor unit 311 can determine that an anomalous state of restoration has occurred with respect to node 130-A. As described above, situational information defined for a plurality of nodes in a particular geographic area can indicate that the geographic area is currently experiencing an outage. For example, if the geographic area is currently experiencing an outage, the situational information for the nodes in the geographic area can commonly indicate a threshold maximum value of zero for the usage data that can be reported by the nodes. If node 130-A communicates operation data to the communication station 120 that indicates an hourly consumption value of 1.5 kWh during the outage, the processor unit 311 can determine that the reported operation data from node 130-A does not represent operation data that is expected to be received from nodes 130 in the geographic area during the outage. Consequently, the processor unit 311 can determine that an anomalous restoration event has occurred with respect to node 130-A.

The threshold operating information and/or situational information defined and recorded in the memory unit 314 can indicate a maximum and/or minimum threshold value for load side voltage during an outage or while the node is disconnected from the electrical distribution network. As described above, the locational information defined for a node can include connection information indicating the number and types of distribution networks to which a meter associated with the node is connected. For example, if a node is not currently connected to the electrical distribution network, the threshold operating information defined for that node can include a maximum threshold value of 0 kWh for electrical consumption, based on the location information defined for the node. In addition, in the case of an outage, the situational information can, as described above, specify a maximum threshold value for power consumption during the outage. If the node communicates operating data exceeding the threshold defined in either of the threshold operating information or the situational information, the processor unit 311 can determine that an anomalous event has occurred. For example, if voltage is detected at nodes that are not supposed to be connected to the electrical distribution network, the processing unit 311 can determine that an anomalous event (e.g., tampering) has occurred at these nodes. Similarly, with respect to water and gas distribution networks, the communication station 120 can determine when the operation data received from a node has reported consumption of water and/or gas when that commodity is not supposed to be consumed at the node.

Similarly, based on the connection information defined in the locational information for a node, the processing unit 311 can determine whether an anomalous event has occurred based on the total number of commodities being consumed. For example, if the threshold operating information defined for the node indicates that the node is authorized to receive both gas and electricity, the processor unit 311 can determine that there may be a leak or outage when the operation data received from the node indicates consumption of electricity but not gas. If the outage or leak is known to the communication station 120, the situational information defined for the node can alter the maximum and/or minimum threshold values defined in the threshold operating information of the node.

Conversely, if the threshold operating information defined for the node indicates that the premises associated with the node is authorized to receive electricity but not gas, the processor unit 311 can determine that an anomalous event has occurred when the operation data received from the node indicates consumption of gas. The consumption of gas by the node not authorized to receive it may be indicative of theft.

The communication station 120 can also determine seasonally anomalous consumption patterns based on the threshold operating information and situational information defined for the node. As described above, the locational information defined for a node can include periodic usage patterns indicating historical consumption of a particular commodity during a predetermined time period, such as historical consumption of electricity in the summer and historical consumption of gas in the winter, for example. Accordingly, unique threshold operating information can be defined for a node based on the periodic usage patterns defined for the node. In addition, situational information can be defined for one or more nodes in a particular geographic region based on periodic usage patterns of the nodes in that geographic region. Operation data received from a node in the utility network 100 can thus be compared against the unique threshold operating information defined for the node and the situational information defined for nodes in the geographic area in which the node is located. Furthermore, according to an exemplary embodiment, situational information defined for a node can alter the threshold operating information defined for the node, based on observed event-, operational-, seasonal- and/or weather-related conditions. The threshold operating information defined for a node can be based on the historical consumption patterns of the node during a particular time period. For example, based on historical usage patterns of 35 to 40 kWh of daily electricity consumption for a particular node in the month of March, threshold operating information recorded in the memory unit 314 for this node can define a maximum daily threshold value of 40 kWh of electricity. If, for example, there is a heat wave during the month of March in a particular geographic area, situational information defined for the nodes in this geographic area can increment the daily threshold value by a factor of 5%, to accommodate increased energy usage, for example, to power air conditioners that normally would not be operated in March. Based on this adjustment, the processor unit 311, when comparing operation data received from the node that indicates a daily consumption amount of 42 kWh, with the threshold operating information and situational information, can determine that the increased daily consumption represents an acceptable operating condition for the node, because the increased daily consumption amount comports with the increase in the maximum threshold value by the situational information.

The threshold operating information defined for a node can also include comparative values of the amount of electricity consumed and the amount of gas consumed for a particular time period. For example, suppose that, based on historical usage patterns defined in the locational information for the node, the amount of electrical consumption is three times greater than the amount of gas consumption in the month of July. Situational information can also be defined for one or more nodes in a predetermined geographic area reflecting similar comparative values of consumption between two commodities. Suppose, for example, that situational information defined for the nodes in geographic area 650 indicates a ratio of 3.5:1 between electrical consumption and gas consumption in the month of July. The processor unit 311 can compare operation data received from a node with the threshold operating information and the situational information defined for the node, to determine whether an anomalous event has occurred with respect to the node. For example, suppose that in the month of July, a node with the above-described threshold operating information and situational information reports operation data to the communication station 120 in which the amount of gas consumption is twice the amount of electrical consumption. This operation data does not comport with either the threshold operating information or the situational information defined for the node, and therefore, the processing unit 311 can determine that an anomalous event has occurred with respect to the node.

As described above, the communication station 120 can utilize demand response events to control demand at peak times such as during hot days in the summer or cold days in the winter. For instance, in accordance with an example described above, the communication station 120 can automatically adjust the thermostat settings of a commercial premises by a predetermined number of increments and/or coefficient for a limited time period. For example, during a warm period in the summer, an electrical distribution network may have a contractual agreement with a supermarket whereby the refrigeration and freezer units of the supermarket are temporarily turned off for a period of ten minutes in an hour during the time of increased demand in the distribution network.

Personnel at the supermarket may have the ability to override such event settings. If personnel at the supermarket can override such event settings, the node(s) at the supermarket could send override requests to the communication station 120 as operation data. Such override events, if received on a large scale from nodes at similar premises, can pose scalability problems and thus should be effectively controlled. Furthermore, when large number of such override requests are received in quick succession, it is suggestive of possibly malicious behavior.

In this example where demand response events are issued to the supermarket during periods of heavy load, the thermostat settings of the refrigeration units are scheduled to be adjusted for a period of ten minutes in an hour of peak demand. For example, if the thermostat settings for the refrigeration units of the supermarket are normally set at a temperature of 36° F., the communication station 120 can turn off the refrigeration unit for a period of ten minutes. At the conclusion of this ten minute period, the thermostat is automatically reset to the 36° F. setting. However, suppose that during this ten minute period of automatic adjustment, personnel of the supermarket manipulate the thermostat settings back to a desired setting, prior to completion of the ten minute adjustment period. As an alternative to such manual overrides, suppose that personnel of the supermarket attempt to manipulate the meter to indicate completion of the demand response event prior to the scheduled end time. For example, personnel may turn off power to the associated NIC 2 before the scheduled end time of the demand response event, so that the thermostat settings can be manipulated without transmission of an override request to the communication station 120. When the NIC 2 associated with the meter is turned back on after the scheduled end time of the demand response event, the thermostat settings of the meter 130 may no longer be automatically controlled according to the demand response event settings. In addition, a multitude of event starts taking place outside a scheduled demand response event in a particular geographic area, customer overrides, and randomization windows of demand response event start and stop times should be taken into consideration before determining whether there are unexpected starts and stops in scheduled demand response events.

In view of these concerns, the threshold operating information defined and recorded in the memory unit 314 for nodes to which demand response events are issued can include information on the time and duration that each demand response event is to occur or has occurred, and when the demand response event is to be concluded according to the scheduled demand response event. Any maximum threshold values for consumption of a particular commodity can be modified in the threshold operating information defined for such nodes to reflect the occurrence of a demand response event. In addition, situational information can be defined for nodes to which demand response events are issued, to account for attempts to override such demand response events. For example, during periods of peak load in which demand response events are issued to particular nodes in a particular geographic region, situational information defined for such nodes can include data indicating that operation data is expected to be received at an increased frequency, as compared to times during which demand response events are not scheduled. For example, suppose that the meter(s) at the supermarket is/are expected to transmit operation data once every hour. When a demand response event is scheduled for the supermarket, the communication station 120 can transmit a control command to the meter(s) 130 at the supermarket that instructs the meter(s) 130 to transmit operation data to the communication station 120 every minute. The processor unit 311 can compare operation data received from the node located at the supermarket with the aforementioned threshold operating information and situational information defined for the node, to determine whether an anomalous event has occurred with respect to the node in relation to the completion of the demand response event.

Residential and commercial premises may be equipped with a home area network device which enables centralized control of various operating parameters of various devices at the premises. For example, a home area network device can be utilized by a customer to set in-house temperature values within a specified temperature range during a predetermined time period. Such home area network devices can be configured to execute one demand response request at a time. If additional demand response requests are issued with overlapping time periods, the home area network device can respond to the most recent request and ignore contradicting instructions from previous requests. However, when a large number of such requests are received in quick succession, it can be indicative of possibly malicious behavior. For example, the issuance of an anomalous string of demand response events to the same or an overlapping set of device classes behind one or more participating meters during an ongoing demand response event that is scheduled for those meters can be indicative of possibly malicious behavior. There may be several device classes serviced by a meter in a home, such as an HVAC compressor or furnace, room heaters, water heaters, aquatic devices such as a pump for a pool, spa or Jacuzzi, smart appliances, electric vehicles, etc., and one or more of these devices may be required to participate in a demand response event. In accordance with an exemplary embodiment, device classes defined in the ZigBee Smart Energy Profile Specification for load control events may be utilized in formulating the threshold operating information and/or situational information for nodes at which a home area network device is installed.

In consideration of the potential for accidental or malicious operation of home area network devices equipped at nodes for which demand response events are scheduled, the threshold operating information defined and recorded in the memory unit 314 for nodes can include information on the time and duration that each demand response event is to occur or has occurred, and when the demand response event is to be concluded according to the scheduled demand response event. Any maximum threshold values for consumption of a particular commodity can be modified in the threshold operating information defined for such nodes to reflect the occurrence of a demand response event. In addition, situational information can be defined for nodes to which demand response events are issued, to account for attempts to override such demand response events. For example, during periods of scheduled demand response events, situational information defined for such nodes can include data indicating that operation data is expected to be received at an increased frequency, as compared to times during which demand response events are not scheduled.

In accordance with the exemplary embodiments illustrated in FIGS. 4 and 5A-5C, the processor unit 311 can compare operation data measured at such nodes with the threshold operating information and situational information defined for the node, to determine whether an anomalous event has occurred with respect to the node in relation to the completion of the demand response event.

The exemplary embodiment of FIG. 6 illustrates an example of a distribution automation system in connection with the distribution network. For instance, as described above, the RTUs and associated NICs located the nodes 620, 630, 640 corresponding to the distribution devices of the distribution network enable operation data measured at these nodes to be communicated to the communication station 120 of the utility provider. In accordance with this exemplary distribution automation system, the communication station 120 can monitor for anomalous threshold settings in the operation of the nodes corresponding to the distribution devices of the distribution network. For example, the communication station 120 can monitor and detect anomalous threshold settings with respect to switch reclosers and power source transfers. In the event that an operation setting of the nodes 620, 630, 640 exceeds a maximum or minimum threshold value defined in threshold operating information for these nodes, the processor unit 311 can detect an anomalous event in connection with one or more of these nodes 620, 630, 640.

For example, in the case of a set of reclosers protecting a circuit in a normal/standby source application for overcurrent protection, the nodes 620, 630, 640 continuously monitor each phase of voltage magnitude. When any phase of voltage drops below a preset level on the control designated as the normal source and an over-current condition does not exist, the normal-source recloser can be configured to trip after a settable time delay. A standby-source recloser can then close after a settable time delay. These preset values for the voltage as well as the trip and close timers for the transfer scheme can be defined in the threshold operating information for these nodes. Accordingly, when the nodes 620, 630, 640 communicate measured operation data to the communication station 120, the processor unit 311 can compare the measured operation data with the control settings defined in the threshold operating information.

In another example, the communication station 120 can monitor an automatic power source transfer scheme from one transformer in a distribution network to another transformer. For example, in the embodiment of FIG. 6, the communication station 120 can record in the memory unit 314 respective threshold operating values in the threshold operating information for each node 620, 630, 640 as well as common operational threshold values in situational information for the nodes 620, 630, 640. In an exemplary embodiment, an automatic power transfer may occur when a breaker opens or the normal source voltage drops below a predefined pickup value. These preset voltages, delay cycle settings for transfers, and settings of the relays pertaining to the breaker and voltage status can be defined in the threshold operating information and/or situational information of these nodes 620, 630, 640 based on operational settings of the nodes 620, 630, 640. In accordance with the exemplary embodiments illustrated in FIGS. 4 and 5A-5C, the processor unit 311 can compare operation data measured at such nodes with the threshold operating information and situational information defined for the node, to determine whether an anomalous event has occurred with respect to the node.

In addition, the threshold operating information and/or situational information defined for the nodes 620, 630, 640 can include threshold settings on any battery-powered RTUs and/or radio communication cards to detect whether an anomalous event has occurred with respect to these operating parameters.

The threshold operating information defined for one or more of the nodes 620, 630, 640 can also include communication parameter values for the nodes 620, 630, 640, such as a defined frequency of communication, a communication protocol, necessary security credentials for communication in the utility network 100, etc. Similarly, common situational information pertaining to the communication parameters of the nodes 620, 630, 640 can be defined and recorded in the memory unit 314. If any of the nodes 620, 630, 640 are disconnected from the utility network 100, the processor unit 311 can detect an anomalous event as a possible tampering with one or more of the nodes 620, 630, 640. For example, according to an exemplary embodiment, the nodes 620, 630, 640 may be connected to the utility network 100 via one or more ebridges or other devices having a similar functionality at any layer of the utility network 100. An ebridge, as used herein, is a device configured to provide communicative functions to distribution automation devices of the distribution network, via the utility network 100.

The threshold operating information and/or situational operating information defined for a node can specify other nodes of the utility network 100 with which the node is authorized to communicate and/or other nodes with which the node is authorized to communicate. For example, a device which does not possess the requisite security certificate chain up to an appropriate operational certificate can be classified as a non-distribution automation device in the situational information defined for a plurality of nodes in the utility network 100. Furthermore, in the event there is suspected to be a device that lacks the required security credentials and that is attempting to communicate with the nodes 620, 630, 640, situational information can be defined for the nodes 620, 630, 640 to indicate a number of communications that the nodes 620, 630, 640 are permitted to receive in a predetermined time period. In the event that distribution automation traffic is generated in a non-distribution automation device lacking the required security credentials, the nodes 620, 630, 640 can transmit operation data indicating receipt of a communication from a non-distribution automation device. The processor unit 311 can compare the operation data from one or more of the nodes 620, 630, 640 with their respective threshold operating information and the situational information defined for these nodes 620, 630, 640 to determine whether there is the possibility of a non-distribution automation device attempting to interfere or tamper with the operation of the nodes 620, 630, 640. For example, according to the security parameters of the nodes 620, 630, 640, if any of the nodes 620, 630, 640 receive distribution automation traffic generated in a non-distribution automation device lacking the required security credentials, the nodes 620, 630, 640 can transmit operation data indicating receipt of the communication from the device lacking the requisite security credentials. The processor unit 311 can determine that an anomalous event has occurred with respect to the transmission of distribution automation traffic from an unauthorized device and transmit a control instruction to the node 620,630, 640 which received the unauthorized communication to not accept the communication and pass the communication on to a distribution automation device hanging off an ebridge. Based on the operation data received from the node 620, 630, 640, the processor unit 311 can also detect the originator of the unauthorized communication and record it as anomalous event.

In another example, the processing unit 311 can monitor for possible transformer overloading in the distribution network. For example, acceptable operating parameters relating to voltage, current and/or temperature levels as well as average demand levels at the transformers 620, 630, 640 can be uniquely defined for each transformer 620, 630, 640 based on respective construction information of the transformers 620, 630, 640. In addition, where appropriate, common threshold values can be defined for the transformers 620, 630, 640 as situational information. The measurement of these operating parameter values can be reported by the nodes 620, 630, 640 as operation data at predetermined time periods, and the processing unit 311 can compare the received operation data with the threshold operating information and situational information defined for the nodes to determine whether any of the transformers is being overloaded. Upon determining that one or more of the transformers is being overloaded, the communication station 120 can transmit a control instruction to the particular node 620, 630, 640 to shed a particular amount of the load at the transformer to ease the present overloading of the transformer. In addition, threshold operating information and situational information can be defined and recorded in the memory unit 314 to facilitate detection of lateral overloading. For example, a node along a feeder line can monitor operational metric data relating to its operation as well as the operation of the other nodes 620, 630, 640. The threshold operating information defined for each node can include a threshold value of aggregate demand for that particular node, while situational information can be defined to include a comparative aggregate demand of each node 620, 630, 640 in the distribution network.

In another example, unique threshold operating information can be defined for each node 620, 630, 640 to include construction information pertaining to operational devices and distribution mediums. The nodes 620, 630, 640 can report to the communication station 120 operation data pertaining to data collected by the RTU, and the operation data can be compared with threshold operating information that is based on historical operating parameters. In addition, situational information defining expected operation data pertaining to the operational metrics of devices and communication mediums in the distribution network can be recorded in the memory unit 314. Based on the received operation data, the processor unit 311 can determine whether there is any feeder or lateral aggregation occurring in the distribution network, for example. If the processor unit 311 determines that feeder or lateral aggregation has occurred, corrective measures can be implemented. For example, new copper can be installed to counteract the feeder and lateral aggregation.

Threshold operating information defined for each node 620, 630, 640 based on historical operating parameters can be effective for improving cooperative data sharing among the devices in the utility network 100. For example, threshold operating information defined for one or more nodes can include population data indicating a numerical quantity of a parameter to be monitored. For example, the population data can pertain to the number of feeders, transformers and/or meters associated with a NIC 2 in the distribution network. Situational information directed to operation data that is expected to be received from these nodes can be defined and recorded in the memory unit 314. Upon receiving operation data from the nodes relating to the population data of the nodes, the processor unit 311 can compare the received operation data with the threshold operating information and situational information to determine, for example, whether there is an unexpected load surge under a particular feeder or transformer, whether the reported operation data is consistent with individualized historical operation data at the feeder, transformer and/or meter, and/or whether the reported operation data is consistent with historical operation data of a feeder, transformer and/or meter in a particular geographic area.

In addition, threshold operating information and situational information can be defined to designate acceptable security standards for communication in the utility network 100. Access failures of a node may be due to the node having the wrong password, key or certificate. Each access failure can be reported as operation data by the node that encountered the access failure, or by another node that denied access to the requesting node lacking the requisite security credentials. The number of access failures reported as operation data to the communication station 120 can be aggregated by the processing unit 311 and recorded in the memory unit 314. The processor 311 can then map each access failure across the utility network 100 over time to detect patterns of security breach. Additional security event counters reported as operation data by a node in the utility network 100 to the communication station 120 can include digital signature verification failures, integrity check (keyed-HMAC) failures, and packet replays, for example.

In another example, the communication station 120 can receive operation data related to geographic coordinates of the nodes in the utility network 100. For example, at the time of installation, GPS coordinates can be recorded in the memory unit 314 for each node in the utility network 100. The respective threshold operating information defined for the nodes can include the respective GPS coordinates of the node. The nodes can be configured to report their GPS coordinates as operation data to the communication station 120 at predetermined intervals. For example, when communicating operation data related to measured consumption values, the nodes can also designate their respective GPS coordinates in the operation data. The processing unit 314 can build a neighbor table as situational information for the nodes in the utility network 100. The neighbor table defined in the situational information can assist the processor unit 311 to map which nodes are near other nodes in a predetermined geographic area. If the processor unit 311 receives from a node operation data including the GPS coordinates of the node, the processor unit 311 can compare the received operation data with the GPS coordinates of the node defined in the threshold operating information for the node and with the neighbor table mapped in the situational information for the nodes in the utility network 100. If at some point the processor unit 311 detects a deviation between the GPS coordinates included in the operation data received from a node based on the comparison of the operation data with the threshold operating information and the situational information, the processor unit 311 can detect that an anomalous event has occurred. For example, if the processor unit 311 determines that the GPS coordinates included in the operation data received from a node does not match the GPS coordinates of the node in the neighbor table defined in the situational information, the processor unit 311 can determine that it is unlikely that the node which reported the operation data can be a neighbor with its current set of neighbors defined in the neighbor table, which could possibly indicate that the node has moved or there has been a tampering with the node.

Threshold operating information can also be defined in the memory unit 314 to include registration information of the node for which the threshold operating information is defined. In addition or alternatively, the threshold operating information can include registration information of other nodes with which the reporting node is authorized to communicate. Furthermore, situational information defined for a plurality of nodes in the utility network 100 can include a compilation of the registered devices in the utility network 100. Operation data received from a node can be compared against the aforementioned threshold operating information and situational information to determine whether an unregistered device is repeatedly trying to join the utility network 100, and/or communicate in a home area network at a premise. For example, if a device is not registered in the communication station and not associated with a specific node of the utility network 100, the processor unit 311 can determine the existence of the unregistered device and compel it to register with the communication station 120 or else prevent nodes in the utility network 100 from communicating with the unregistered device until it is successfully registered.

According to an exemplary embodiment, a smart grid platform can be utilized to shift large loads to off-peak periods to drive the peak period down. Based on load usage information identifying devices that are serviceable at the premises where a node is located, threshold operating information can be defined for the node to restrict operation of large load devices located at the premises. As used herein, a "load device" is a device located at a premises which is operated in accordance with a particular commodity received at the premises. For example, the threshold operating information defined for a node can include a maximum threshold value of power that can be consumed at the node at specific time periods. Situational information recorded in the memory unit 314 can define such periods of peak demand, and decrease the acceptable maximum threshold value of consumption that is defined in the threshold operating information for a particular node. For example, suppose that a charge receptacle for a PHEV is installed at a premises at which a node of the utility network 100 is located. If the PHEV is plugged in during a period of peak demand and the operation data indicating a total consumption value exceeds either the threshold operating information or situational information defined for the node, then the processor unit 311 can control the node to turn off the large load PHEV device. Such threshold operating information and situational information defined for a node can also be utilized to determine the occurrence of other anomalous events. For example, the processor unit 311, based on the comparison of received operation data with the threshold operating information and situational information defined for a node, can detect a series of spikes in load in a home area network during peak hours. The threshold value for detecting a spike in load in meters and/or devices associated with the home area network can be set according to load patterns in the distribution network. In addition, the processor unit 311 can detect an unusual peak or off-peak usage constituted by a statistically significant surge or drop in relation to historical usage at the premise, and a statistically significant baseline usage change at the premises. Furthermore, the processing unit 311 can detect unusual changes in comparative usage patterns in a predetermined geographic area, such as when usage patterns at one or more nodes fluctuates widely in comparison to fluctuations in usage patterns at other nodes in the geographic area.

In another exemplary embodiment, threshold operating information defined for a node can include the cryptographic credentials that are required to be used by the node to communicate with another node in the utility network 100. The situational information defined for the nodes in the utility network 100 can include, for example, an aggregation of the security credentials of the nodes in the utility network 100, the number of communications that a node can make to another node within a specific time period, and/or an identity of nodes whose cryptographic credentials have been corrupted. For example, field service units (FSUs) in the utility network 100 are assigned cryptographic credentials to enable them to communicate with other nodes in the utility network 100. The cryptographic credentials of the FSUs can be monitored in the communication station 100 by logging either security association formations or additions to neighbor tables on the meters 130, access points 110, ebridges, and/or relays 140 with which the FSUs communicate or attempt to communicate. The nodes with which the FSUs communicate or attempt to communicate can transmit operation data indicating whether the cryptographic credentials of a FSU enabled a successful communication with the FSU. The processor unit 311 can cause the memory unit 314 to record such operating data relating to the cryptographic credentials of the FSUs to create logs in the communication station 120. The logs can be accessed by the processor unit 311 to locate rogue, blacklisted or lost FSUs, FSUs that have exceeded their allowable limit of the number of transactions but persisted in failed communication attempts, and/or to detect FSUs deviating from expected routes based on defined work order management system routes.

Threshold operating information and situational information can be defined for a node based on any operating parameter which is desired to be monitored in the communication station 120. The following are examples of operating parameters which may be measured by a node and monitored in the communication station 120 to monitor the operational state of various devices serviceable at a node, the operational state of the utility network 100 and/or the operational state of the distribution network.

For example, minimum and maximum threshold values can be defined in threshold operating information and situational information to monitor the temperature of the NIC 2 and/or the associated meter. According to an exemplary embodiment, a thermometer can be installed in the NIC 2 and/or associated meter, and when operation data is reported by the node, the processor unit 311 can detect whether the measured temperature values potentially indicate overheating or impending failures, for example. Similarly, temperature profile changes can be measured for various devices serviceable at a node, the operational state of the utility network 100 and/or the operational state of the distribution network, based on acceptable profile values defined in the threshold operating information and expected profile values defined in the situational information.

In another exemplary embodiment, line impedance trends associated with a power line carrier can be monitored by the communication station 120, based on threshold values defined in threshold operating information and/or situational information for one or more nodes in the utility network 100. Fluctuations in line impedance trends can be indicative of feeder or lateral power theft, for example. In addition, measured values for line frequency and line harmonic content can be compared against threshold values defined in threshold operating information as well as expected measurement values defined in situational information based on similar operating parameters in a predetermined geographic region. In accordance with another exemplary embodiment, threshold operating information defined for a node can include threshold values on spectrum analysis in connection with the wireless communication technique utilized by a utility meter 130, and situational information defined for the node can include expected spectrum analysis data based on the operating parameters of other nodes in a predetermined geographic area. For example, if the NIC 2 of the node communicates with other nodes via radio frequencies (RF), the processing unit 311, upon receiving operation data from the node, can compare the received operation data with the threshold operating information and situational information to determine if the RF bands are becoming too crowded or jammed. Similarly, based on operation data received from nodes, the processing unit 311 can monitor packet rates of all the nodes to determine if unregistered or unknown devices are using the same network as nodes registered with the communication station 120, whether the utility network 100 is close to saturation, the rate of packet loss in the utility network 100, and/or whether it would be advantageous to add a relay 140 at a particular location to improve traffic distribution in the utility network 100.

The foregoing examples of threshold operating information, locational information and situational information are intended to illustrate different types of operating parameters of nodes that can be monitored by the communication station 120 to detect whether an anomalous event has occurred with respect to one or more nodes in the utility network 100. The present disclosure is not limited to the foregoing examples.

In exemplary embodiments described above, the control unit 310 of the communication station 120 was described as comparing operation data received from another node (e.g., utility meter 130) in the utility network 100 with (1) the threshold operating information defined and recorded in the memory unit 314 for the node from which the operation data was received, and (2) the situational information defined and recorded in the memory unit 314. According to an exemplary embodiment, the control unit 310 can compare the actual operation data received from another node with the threshold operating information defined for that node, and with the situational information. However, it is possible for the operation data received from a node to be in a different format and/or protocol than the threshold operating information and/or situational information recorded in the memory unit 314. For example, suppose that a node such as utility meter 130 transmits operation data to the communication station 120 indicating a daily consumption rate of 40 kWh. The threshold operating information and/or situational information can be respectively defined and recorded in the memory unit 314 in a different format and/or protocol than the numerical value format of the operation data received from the downstream node. For example, the threshold operating information can be defined and recorded in the memory unit 314 of the communication station 120 as a range of values, e.g., 38-42 kWh, and the situational information can be defined and recorded in the memory unit 314 of the communication station 120 as a percentage increase or decrease (e.g., 5%) of the maximum or minimum threshold value defined in the threshold operating information. As another example, the operation data received from a downstream node can be encrypted and/or encoded according to a predetermined security protocol between nodes in the utility network 100.

In the event that the threshold operating information and/or situational information is/are recorded in the memory unit 314 in a different format and/or protocol than the operation data received from a downstream node, the control unit 310 of the communication station 120 may perform conversion and/or calculation operation(s) prior to comparing the operation data with (1) the threshold operating information and (2) the situational information recorded in the memory unit 314. For instance, in the above example where the situational information is recorded in the memory unit 314 as a percentage increase and/or decrease of the threshold operating information, the control unit 310 would calculate the maximum and/or minimum threshold value of the situational information based on the value of the threshold operating information recorded in the memory unit 314, and then compare the operation data received from the downstream node with the calculated maximum and/or minimum threshold value of the situational information. In the above example where the operation data is transmitted to the communication station 120 in an encrypted and/or encoded format by a downstream node, the control unit 310 would first decrypt and/or decode the received operation data and then compare the decrypted and/or decoded operation data with the threshold operating information and the situational information recorded in the memory unit 314. As used herein, the operation of the control unit 310 in comparing operation data received from a downstream node with (1) the threshold operating information and (2) the situational information recorded in the memory unit 314 is intended to encompass any preliminary or preparatory conversion and/or calculation operation(s) performed by the control unit 310 on the received operation data, the recorded threshold operating information and/or the recorded situational information, prior to comparing the received operation data with (1) the threshold operating information and (2) the situational information in accordance with the exemplary embodiments described above.

X. Exemplary Method of Operating a Communication Station of a Utility Provider

Figure 7:
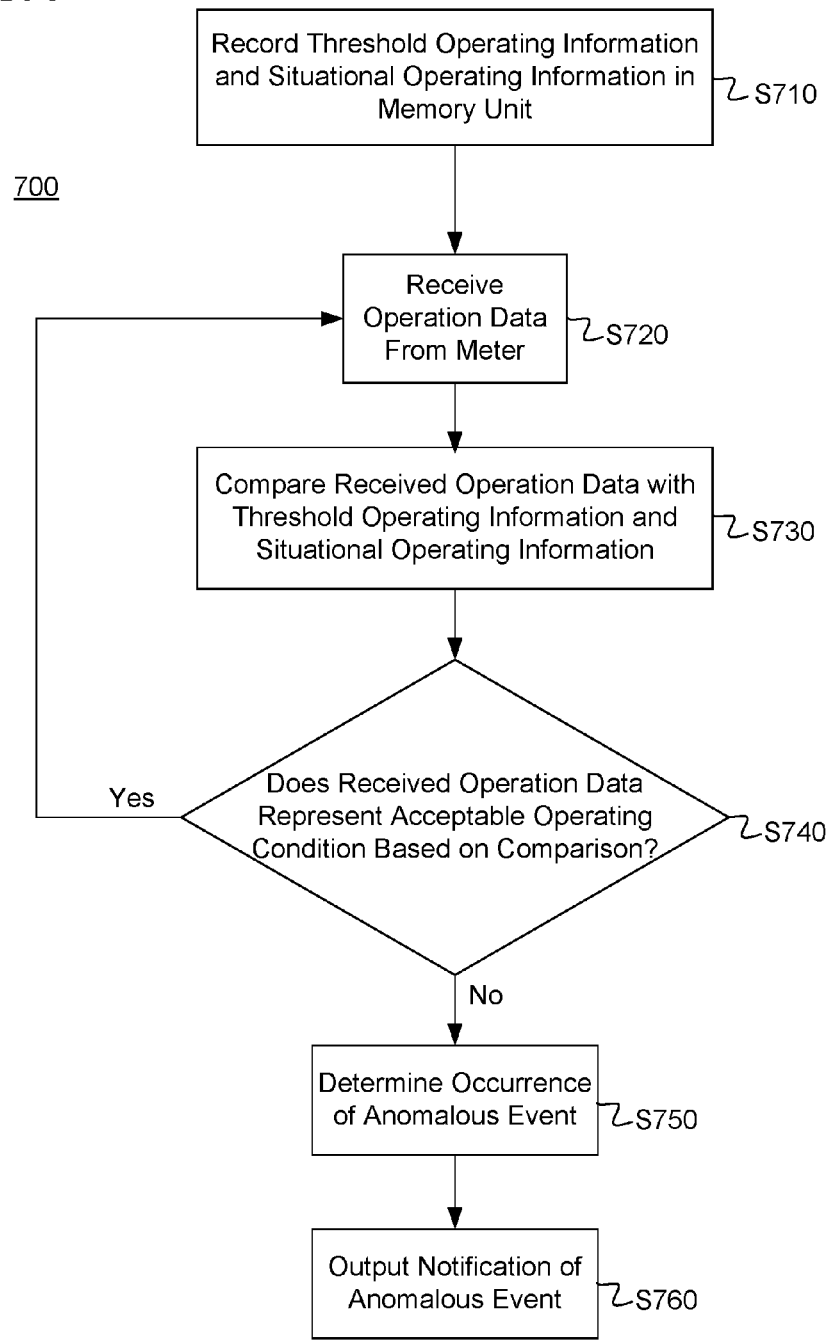
FIG. 7 is a flowchart diagram illustrating an exemplary method of operating a communication station of a utility provider to detect whether anomalous events occur in connection with one or more nodes in the utility network.

An exemplary embodiment of the present disclosure also provides a method 700 of operating a communication station 120 of a utility provider (e.g., a utility network communication device) to detect anomalous events occurring in connection with at least one node in the utility network 100. FIG. 7 illustrates various features of the exemplary method.

In step S710, threshold operating information and situational information are defined and recorded in the memory unit 314 of the communication station 120. In accordance with the exemplary embodiments described above, the threshold operating information includes data indicative of configured acceptable operating parameters of the nodes in the utility network 100 based on respective locational information of the nodes in the utility network 100, and the situational information includes data indicative of configured operation data that is expected to be received from nodes in the utility network 100 during a predetermined time period, based on at least one of a condition and event that is occurring during the predetermined period of time. In step S720, operation data is received from at least one node in the utility network 100.

In step S740, the processing unit 311 of the communication station 120 compares the received operation data with the threshold operating information and the situational information defined for the at least one node from which the operating data was received.

In step S740, the processing unit 311 determines whether the received operation data constitutes an anomalous event based on the comparison of the received operation data with the threshold operating information and the situational information in step S730. For instance, in step S740, the processing unit 311 determines whether the received operation data represents an acceptable operating condition for the node based on the comparison in step S730. If the processing unit 311 determines that the received operation data represents an acceptable operating condition based on the comparison in step S730, the processing unit 311 waits to receive new operation data from a node in the utility network 100 and therefore returns to step S720.

On the other hand, if the processing unit 311 does not determine that the received operation data represents an acceptable operating condition for the node from which the operation data was received, based on the comparison in step S730, the processing unit 311 determines that an anomalous event has occurred with respect to the node from which the operation data was received. In step S760, the notification unit 340 of the communication station 120 outputs notification of the determined anomalous event.

In the exemplary method illustrated in FIG. 7, steps S730 and S740 can include any of the operations defined with respect to the exemplary embodiments illustrated in FIGS. 4 and 5A-5C. In addition, the exemplary method illustrated in FIG. 7 can include any of the features of the above-described exemplary embodiments.

Furthermore, another exemplary embodiment of the present disclosure provides a computer-readable recording medium on which a computer program is recorded that causes the control unit 310 of the communication station 120 to detect anomalous events occurring in connection with at least one node in the utility network 100. With reference to the exemplary embodiment illustrated in FIG. 3, the ROM 312, memory unit 314 and/or memory card/disc inserted into the memory slot 350 can constitute a computer-readable recording medium on which an operating system and/or application programs of the communication station 120 can be recorded and executed by the control unit 310. The control unit 310 is configured to communicate with any of these computer-readable recording media and thus is communicatively connected to these computer-readable media. The program recorded on the computer-readable recording medium can cause the control unit 310 to perform any of the operations of the exemplary embodiments described above.

XI. Exemplary Utility Network Interface Device Configured to Detect Anomalous Events Occurring with Respect to the Utility Network Interface Device Another exemplary embodiment of the present disclosure provides a utility network interface device (hereinafter abbreviated as "NIC 2") configured to detect anomalous events occurring in connection with at least one node in the utility network 100. As described above, the NIC 2 can be associated with a utility meter in the utility network 100 and constitute a node in the utility network 100. Accordingly, the NIC 2 can be configured to detect anomalous events occurring in connection with the NIC 2 and/or the meter with which the NIC 2 is associated.

With reference to the exemplary embodiment illustrated in FIG. 2, the NIC 2 comprises a memory unit 7. The memory unit 7 has defined and recorded therein threshold operating information including configured acceptable operating parameters of the node in the utility network 100. The threshold operating information defined for the node can be unique to the particular node in which the threshold operating information is recorded. The threshold operating information recorded in the memory unit 7 can be programmed in the memory unit 7 at the time the NIC 2 is installed at the meter with which the NIC 2 is associated. Accordingly, threshold operating information can be commonly defined for various NICs 2, for example, at the time of installation, and/or the time of initial programming of the NICs 2. Alternatively or in addition, the threshold operating information can be transmitted to the NIC 2 by the communication station 120, via one or more other nodes in the utility network 100, and defined and recorded in the memory unit 7. Alternatively or in addition, the threshold operating information can be generated by the NIC 2 based on operating parameters that are monitored in the NIC 2 over a predetermined period of time. For example, acceptable operating parameters to be defined in the threshold operating information can be based on operating parameters that are monitored in the NIC 2 over a forty-five (45) day period. The acceptable operating parameters of the NIC 2 can then be defined based on a predetermined metric of the empirically observed operating parameters. For example, if the average daily consumption rate of a certain commodity is 40 kWh over this forty-five day period, the daily threshold consumption value for this commodity can be defined to be 45 kWh. Alternatively, the threshold consumption value of the commodity defined in the threshold operating information can be based on the maximum daily consumption value observed during the forty-five day period. In the event that the threshold operating information defined in the NIC 2 is based on historically observed operating parameters, the NIC 2 itself can generate the threshold operating information, or the communication station 120 of the utility provider can transmit the threshold operating information to the NIC 2, based on the operation data reported to the communication station 120 from the NIC 2.

Similar to the threshold operating information defined and recorded in the memory unit 314 of the communication station 120, the threshold operating information recorded in the memory unit 7 of the NIC 2 can include configured threshold values of any operating parameter (e.g., usage data, operational metric data, etc.) of the NIC 2 and/or the associated meter that is desired to be monitored. For example, the threshold operating information recorded in the memory unit 7 can include a threshold value or a range of threshold values (e.g., maximum and minimum values) for each type of information that is to be monitored in the NIC 2.

In addition to or as an alternative to defining a threshold value or a range of threshold values, the threshold operating information can also define a predetermined state or condition, such as a state signal indicating the occurrence or non-occurrence of a current state or condition (e.g., on or off, connected or not connected, true or false, etc.). The state signal can include a binary value such as zero (0) or one (1) to represent the occurrence or non-occurrence of the state or condition to be monitored by the communication station 120. In this case, the threshold value defined in the threshold operating information can be the existence or non-existence of the value representing the occurrence or non-occurrence of the predetermined state or condition. For example, if the threshold operating information defines whether a premises at which a meter 130 is located is currently receiving a particular commodity from the associated distribution network, the threshold operating information can include a value of one (1) to indicate that the associated premises is currently receiving with the commodity, or a value of zero (0) to indicate that the associated premises is not currently receiving the commodity.

The threshold operating information recorded in the memory unit 7 of the NIC 2 can include any of aforementioned types of information that are defined in the threshold operating information recorded in the memory unit 314 of the communication station 120 (e.g., usage data, operational metric data, etc.). Examples of different types of threshold operating information recorded in the memory unit 7 of the NIC 2 are described below.

The NIC 2 also includes a network interface (e.g., transceiver 9, antenna 11) configured to receive communications from one or more other nodes in the utility network 100, such as a neighboring meter 130, an access point 110, a relay 140 and/or the communication station 120, and to transmit communications to one or more other nodes in the utility network 100.

In addition, the NIC 2 includes a control unit. As described above, the control unit the NIC 2 can be encompassed by the CPU 6 individually or in combination with the ASIC 5. The control unit of the NIC 2 is configured to monitor operating parameters of the NIC 2, generate operation data representing the monitored operating parameters, and record the generated operation data in the memory unit 7 of the NIC 2. In addition, the control unit of the NIC 2 is configured to cause the network interface of the NIC 2 to transmit the generated operation data to one or more other nodes in the utility network 100. The operation data generated by the NIC 2 can be any of the aforementioned types of operation data described with respect to the exemplary embodiments of the communication station 120. For example, the operation data generated by the control unit of the NIC 2 can include usage data measured by the NIC 2, operational metrics data of the NIC 2, and operational metrics data of the associated meter.

The control unit of the NIC 2 is also configured to compare the generated operation data with the threshold operating information recorded in the memory unit 7, and determine whether the generated operation data indicates an anomalous event based on the comparison of the generated operation data with the threshold operating information recorded in the memory unit 7. In comparing the generated operation data with the threshold operating information, and determining whether an anomalous event has occurred, the control unit of the NIC 2 is configured to perform processing operations similar to any of the exemplary processing operations of the processor unit 311 as described above. For example, the control unit of the NIC 2 can perform any of the exemplary processing operations illustrated in FIGS. 4 and 5A-5C.

The NIC 2 also includes a notification unit configured to output, external to the associated utility meter, notification of the determination of an anomalous event by the control unit of the NIC 2. According to an exemplary embodiment, the notification unit can be constituted by the transceiver 9, antenna 11, and/or LED 16 of the NIC 2. For example, if the control unit determines that an anomalous has occurred with respect to the NIC 2, the control unit can be configured to automatically control the transceiver 9 to externally output a signal containing notification of the determined anomalous event to a neighboring node with which the NIC 2 is authorized to communicate. The control unit can be configured to generate the notification signal to include an alert indicator (e.g., a flag) that can be recognized by the receiving node that the notification signal contains notification of a detected anomalous event. The NIC 2 can instruct the neighboring node to forward the notification signal to the communication station 120 of the utility provider and/or an access point 110 of the utility network 100, which can in turn forward the notification signal to the communication station 120. In addition to or as an alternative to the transceiver 9 transmitting a signal to a neighboring node, the control unit of the NIC 2 can control the notification unit to output a visual indication of the determined anomalous event. For example, the control unit can cause the LED 16 to display a representation of the determined anomalous event according to a predetermined pattern of illuminating the LED 16. The pattern of illumination can be associated with the type of the anomalous event that was detected. In the exemplary embodiment of FIG. 2, one LED 16 is illustrated. However, additional LEDs may be provided, and the LEDs may be single or multi-color.

The notification unit of the NIC 2 outputs notification of the determined anomalous event at the time that the anomalous event is determined to have occurred, to thereby provide real-time notification of the determination of the anomalous event.

According to an exemplary embodiment, the threshold operating information recorded in the memory unit 7 can specify a maximum threshold value of a particular commodity that is to be consumed at the premises associated with the NIC 2. For example, suppose that the threshold operating information defined and recorded in the memory unit 7 specifies a maximum daily threshold value of 40 kWh for consumption of electricity at the premises at which the NIC 2 is located. In this example, the control unit of the NIC 2 can determine whether an anomalous event has occurred with respect to the NIC 2, based on a comparison of the operation data generated by NIC 2 with the threshold operating information recorded in the memory unit 7. If an anomalous event is determined to have occurred in the NIC 2, the control unit causes the notification unit to output an appropriate notification of the determined anomalous event external to the meter with which the NIC 2 is associated. For example, if the control unit of the NIC 2 is configured to monitor the amount of electricity consumed at the associated premises on a daily basis, via interaction with the meter interface 8 of the NIC 2, for example, suppose that the monitored amount of electricity consumption for the day is 45 kWh. The control unit of the NIC 2 then generates operation data indicating a daily consumption value of 45 kWh. The control unit then compares the generated operation data with the threshold operating information recorded in the memory unit 7. In this example, the control unit will determine that the generated operation data indicates an anomalous event, because the generated operation data indicating 45 kWh exceeds the threshold value of 40 kWh defined in the threshold information recorded in the memory unit 7 of the NIC 2. Accordingly, the control unit will generate a notification signal including data identifying the determined anomalous event, and control the notification unit to output the notification signal. For example, the control unit can control the notification unit to transmit the notification signal to the communication station 120 via another node in the utility network 100, such as a neighboring meter node, an access point 110 and/or a relay 140. When generating the notification signal, the control unit can include an alert message (e.g., a flag) that can be recognized by the node receiving the notification signal so that the notification signal is promptly forwarded to the communication station 120.

According to another exemplary embodiment, the threshold operating information can specify a maximum daily threshold value of a particular commodity being consumed at the premises associated with the NIC 2 during a predetermined time period. For example, suppose that the threshold operating information recorded in the memory unit 7 of the NIC 2 specifies a maximum threshold value of 1,800 kWh over a forty-five (45) day period. As described above, the control unit of the NIC 2 records the operation data generated by the control unit in the memory unit 7 at the time the operation data is generated. In this example, the control unit can thus generate operation data indicating an accumulated, total value of consumption over the forty-five day period. Suppose, for example, that at the conclusion of the forty-five day period, the accumulated value of energy consumption at the premises associated with the NIC 2 includes a total consumption value of 1,900 kWh. The control unit of the NIC 2 is configured to compare the generated operation data indicating a cumulative consumption value of 1,900 kWh during the forty-five day period with the threshold operating information defining a threshold maximum value of 1,800 kWh for a forty-five day period. In this example, the control unit of the NIC 2 will determine that an anomalous event has occurred, because the generated operation data exceeds the threshold value defined in the threshold operating information recorded in the memory unit 7 of the NIC 2. Based on this determination, the control unit of the NIC 2 generates a notification signal indicating the detection of the anomalous event, and controls the notification unit to transmit a notification signal to another node in the utility network 100, such as a neighbor meter node, an access point 110 and/or a relay 140, to forward the notification signal to the communication station 120.

In the above example in which the control unit of the NIC 2 compares accumulated operation data with threshold operating information defining a threshold maximum value over a predetermined period of time, the control unit of the NIC 2 determined the occurrence of anomalous event at the conclusion of the predetermined period of time. Alternatively, the control unit of the NIC 2 can be configured to compare the generated operation data on the basis of a sliding time window. For example, in the above example in which the threshold operating information defines a threshold value of 1,800 kWh for a forty-five day period, the control unit of the NIC 2 can be configured to continuously compare the generated operation data with a fractional amount of the threshold value defined in the threshold operating information based on the number of days that have elapsed in the period of time. In the above example in which the threshold operating information defines a threshold value of 1,800 kWh over a forty-five day period, the average daily amount of this threshold value would be 40 kWh per day. Rather than wait to determine whether an anomalous event has occurred at the conclusion of the predetermined period of time, the control unit can be configured to determine an anomalous event prior to the conclusion of the predetermined period of time. For example, based on an average daily consumption amount of 40 kWh per day, the control unit can generate operation data that includes a counter value indicating the number of times during the predetermined period of time that the daily monitored consumption value exceeds the average value of 40 kWh. The threshold operating information defined in the memory unit 7 can also include a threshold value representing an acceptable number of times that the monitored daily consumption value can exceed the average daily consumption value. For example, suppose that the threshold operating information, in addition to defining a threshold value of 1,800 kWh for a forty-five day period, also defines a counter value of ten (10) that represents an acceptable number of times that the monitored daily consumption value can exceed the average daily consumption value. In this example, the control unit can be configured to generate operation data including a counter value representing the number of times that the monitored consumption value exceeds the average daily consumption value. For example, suppose at day three during the forty-five day period, the control unit generates operation data indicating a consumption value of 42 kWh for that day. The control unit will then, in turn, increment the counter value that is included in the operation data recorded in the memory unit 7. Upon each increment of the counter value, the control unit can be configured to compare the counter value defined in the recorded operation data with the threshold operating information indicating the acceptable number of times that the monitored daily consumption value can exceed the average daily consumption value. Suppose, for example, at day twenty during the forty-five day period, the control unit increments the counter defined in the recorded operation data to a value of eleven. Upon incrementing the counter value to a value of eleven, the control unit will, in this example, determine that an anomalous event has occurred in the NIC 2, based on the comparison of the generated operation data with the threshold operating information indicating the acceptable number of times that the monitored daily consumption value can exceed the average daily consumption value. Accordingly, in this example, the control unit will generate the notification signal identifying the determination of the anomalous event and control the notification unit to transmit the notification signal at day twenty of the forty-five day period, rather than at the conclusion of the forty-five day period.

The determination of an anomalous event on the basis of a sliding time window is not limited to the foregoing example of average daily consumption values. The control unit can determine the occurrence of an anomalous event for any type of threshold operating information in accordance with a sliding time window. If the threshold operating information defines an acceptable operating parameter over a predetermined period of time, the control unit of the NIC 2 can be configured to determine the occurrence of an anomalous event at the point in time that the operation data generated by the control unit does not comport with the acceptable operating parameters defined in the threshold operating information, rather than wait to determine the occurrence of the anomalous event at the conclusion of the predetermined period of time. For example, suppose that the threshold operating information recorded in the memory unit 7 indicates the number of times that a NIC 2 associated with a meter can receive an unsecured communication from another meter node in the utility network 100. As described above, nodes in the utility network 100 communicate with each other according to defined security protocols. The threshold operating information recorded in the memory unit 7 of a NIC 2 can define the acceptable number of times that a NIC 2 can receive a communication from another node in the utility network 100 without the proper security credentials in a predetermined period of time. According to an exemplary embodiment, the NIC 2 can transmit a communication failure message to the node from which the NIC 2 received a communication without the proper security credentials. The threshold operating information defined in the memory unit 7 can include a threshold value indicating a maximum number of times that the NIC 2 can transmit a communication failure message to another node attempting to communicate with the NIC 2 during a predetermined period of time. For example, the threshold operating information defined in the memory unit 7 of the NIC 2 can include a threshold value of five communication failure messages transmitted in one day to another node which is attempting to communicate with the NIC 2. In this example, the control unit of the NIC 2 increments the value of a counter defined in operation data recorded in the memory unit 7 each time the NIC 2 transmits a communication failure message to the other node. The threshold value defined in the threshold operation information can define an acceptable value, such that the threshold value must be exceeded before there will be a detection of an anomalous event. Alternatively, the control unit of the NIC 2 can be configured to determine that an anomalous event has occurred when the value of the incremented counter is greater than or equal to the threshold value defined in the threshold operating information. Accordingly, in this example, when the incremented value of the counter representing the number of communication failure messages transmitted to the other node in one day is equal to or greater than the threshold value defined in the threshold operating information, the control unit will determine that an anomalous event has occurred based on a comparison of the counter value included in the recorded operation data with the threshold operating information recorded in the memory unit 7. Upon this determination, the control unit is configured to generate a notification signal indicating the determination of the anomalous event, and control the notification unit to transmit the notification signal to another node distinct from the node that transmitted the unsecured communications. For example, the NIC 2 can transmit the notification signal to a neighboring meter node, an access point 110, and/or a relay 140, to forward the notification signal to the communication station 120.

In the foregoing example, the threshold operating information defined a threshold value of the number of failure communication messages that can be sent in a predetermined period of time. The present disclosure is not limited to this example. For example, the threshold value defined in the threshold operating information can include information defining the number of other nodes to which the node transmits a communication failure message in a predetermined period of time, the type of failures, the type of messages transmitted to the other nodes, etc.

According to an exemplary embodiment, when a node (e.g., meter 130) in the utility network 100 communicates with other nodes in the utility network 100, the node can search for an optimal communication path to an access point, based on communication factors such as a path cost and link cost to the access point 110. Factors involved in the path and link costs can include, for example, the number of hops from the node to an access point 110, the number of neighbor nodes with which another node communicates, transmission efficiency, bit error rate and transmission power of the neighbor nodes, etc. When searching for an optimal communication path to an access point 110, a node builds a routing table, which has registered therein the neighboring nodes with which the node is authorized to communicate. The routing table of the node may include a number of upstream nodes which the node may use to transmit communications to the access point 110, and a number of downstream nodes from which the node receives communications to forward on to the access point 110. For example, suppose that a first node can function as a proxy or gateway node for a number of downstream nodes to transmit communications from the downstream node to an access point 110. In this example, the routing table of the first node will include routing registration messages from each downstream node which has requested the first node to forward messages on to the access point 110. The threshold operating information defined in the NIC 2 constituting the first node can include a threshold value of un-registration messages received from the downstream nodes registered in the routing table of the NIC 2 which transmit an un-registration message to the NIC 2 during a predetermined period of time. In this example, the control unit of the NIC 2 can be configured to increment a value of a counter each time that the NIC 2 receives an un-registration message from a downstream node registered in the routing table of the NIC 2, and generate operation data representing the increased value of the counter. The control unit 2 can also be configured to compare the value of the counter represented in the generated operation data with the threshold value included in the threshold operating information recorded in the memory unit, and determine that an anomalous event has occurred when the value of the counter is greater than or equal to the threshold value included in the threshold operating information recorded in the memory unit 7 of the NIC 2. The control unit of the NIC 2 can generate a notification signal indicating the determination of the anomalous event The threshold operating information defined in the memory unit 7 of the NIC 2 can indicate a maximum number of communications that the NIC 2 is expected to receive from another node in the utility network 100 in a predetermined time period. For example, the threshold operating information can indicate that the NIC 2 is not expected to receive more than five communications from any one node in a given day. In this example, if the operation data generated by the NIC 2 that represents the number of communications received by the NIC 2 does not comport with the threshold operating information, the control unit of the NIC 2 will determine that an anomalous event has occurred. In this example, suppose that the NIC 2 has received a total of ten communications from a particular node in the utility network 100 in one day. As such, the operation data measured by the control of the NIC 2 in relation to the number of communications the NIC 2 has received from the other node does not comport with the threshold operating information recorded in the memory unit 7 of the NIC 2. Accordingly, based on a comparison of the measured operation data pertaining to the number of communications received from the other node in a single day, the control unit will determine that an anomalous event has occurred with respect to the situation that the NIC 2 received ten communications from another node in a single day. Based on this determination, the control unit of the NIC 2 will cause the notification unit to output an appropriate notification indicating that an anomalous event was detected with respect to the node from which the NIC 2 received a total of ten communications in a single day.

In accordance with an exemplary embodiment, the threshold operating information defined in the memory unit 7 of the NIC 2 can indicate a threshold value for the number of synchronization packets which the NIC 2 sends to another node in the utility network 100 within a predetermined period of time. For example, if the NIC 2 is rebooted or needs to reset its synchronization pattern with another node in the utility network 100, the threshold operating information can define a threshold value for the number of synchronization attempts the NIC 2 performs to establish synchronization with another node (e.g., a meter node 130, an access point 110, a relay 140, etc.) in the utility network 100 and/or the number of synchronization packets the NIC 2 sends to another node in the utility network 100. According to an exemplary embodiment, when communicating with another node in the utility network 100, the NIC 2 can transmit a time synchronization packet(s) to the other node to indicate to the other node a time period when the other node should expect to receive information (e.g., operation data) transmitted from the NIC 2. Upon receiving the synchronization packet(s) from the NIC 2, the other node can operate in a reception mode during this period of time to receive the information transmitted from the NIC 2. For example, suppose that a NIC 2 transmits a synchronization packet(s) to another node indicating that the NIC 2 will transmit information to the other node during a period from 2:00 pm to 2:10 pm. The other node will, upon receiving the synchronization packet(s) from the NIC 2, operate in a reception mode during this ten minute time period. If the NIC 2 transmits a synchronization packet(s) to the other node and the other node does not acknowledge receipt of the synchronization packet, the NIC 2 can resend the synchronization packet to the other node. The threshold operating information defined in the memory unit 7 of the NIC 2 can therefore include a threshold value indicating the number of times that the NIC 2 can expect to transmit a synchronization packet to the other node in a particular time period.

For example, the threshold operating information defined in the NIC 2 can specify a threshold value of three for the number of unacknowledged synchronization packets transmitted to another node in the span of a fifteen minute period. Suppose, for example, that during the span of fifteen minutes, the NIC 2 transmits a synchronization packet to a first node in three separate increments, but these synchronization packets are not acknowledged by the first node. Based on the threshold operating information defined in the memory unit 7 specifying the maximum number of unacknowledged synchronization packets during this period of time, the NIC 2 can then generate and transmit a signal to a second node in the utility network 100 (i.e., a different node than the first node with which the NIC 2 was attempting to establish synchronization) to indicate that the NIC 2 is having difficulty establishing synchronization with the first node. The second node can, in turn, transmit the notification transmitted from the NIC 2 to the communication station 120 of the utility provider.

In accordance with an exemplary embodiment, the threshold operating information defined in the memory unit 7 of the NIC 2 can also specify a threshold value for the frequency with which the NIC 2 must establish synchronization with another node to communicate with the other node. For example, the threshold operating information defined in the memory unit 7 of the NIC 2 can specify a maximum threshold value for how often the NIC 2 is expected to establish synchronization with another node in the utility network 100. Suppose, for example, that the threshold operating information defined in the memory unit 7 of the NIC 2 indicates that the NIC 2 is expected to establish synchronization with another node (e.g., a meter node 130, an access point 110, a relay 140, etc.) a maximum of three times per day. In this example, if the NIC 2 must establish synchronization with the other node more than three times in one day, then the NIC 2 can generate and transmit a notification signal to that same node or another node in the utility network 100 (i.e., a different node than the node with which the NIC 2 was attempting to establish synchronization) to indicate the abnormal amount of times the NIC 2 is having to establish synchronization with that node. The node receiving the notification signal from the NIC 2 can, in turn, transmit the notification transmitted from the NIC 2 to the communication station 120 of the utility provider.

In accordance with another exemplary embodiment, the threshold operating information can specify maximum threshold values for various operating parameters that are to be monitored in the NIC 2. For example, suppose that the threshold operating information specifies maximum threshold values of voltage, current, switch recloser status and temperature recorded in an RTU equipped with an associated NIC 2. If the operation data measured with respect to operating parameters of the RTU do not comport with the threshold operating information recorded in the memory unit 7 of the NIC 2, then the control unit of the NIC 2 will determine that an anomalous event has occurred with respect to the operation data that did not comport with the threshold operating information or situational operation information.

In another example, suppose that the threshold operating information specifies the security credentials that are required for the NIC 2 to be able to communicate with another node in the utility network 100. Suppose also that the geographic area in which the NIC 2 is located is experiencing an outage in the electrical distribution network. If power is restored to the meter associated with the NIC 2 before power is restored to any other node in the geographic area in which the outage is occurring, the NIC 2 will likely be unable to communicate with any of the neighboring nodes. Based on the likely inability of the NIC 2 to communicate with any of the neighboring nodes, the control unit of the NIC 2 can be configured to determine that the security credentials of the NIC 2 are not trusted by the neighboring nodes, and therefore the control unit may determine that the measured operation data relating to the inability of the NIC 2 to communicate with the neighboring nodes does not comport with the threshold operating information defined in the memory unit 7. In this example, the measured operation data relating to the inability of the NIC 2 to communicate with neighboring nodes is not precisely directed to the same operational metric defined in the threshold operating information. However, if the control unit 6 is not able to establish communication with the neighboring nodes and is not informed of the specific reason for the inability to establish communication with the neighboring nodes, the control unit 6 can be configured to automatically determine that the security credentials of the NIC 2 or the security credentials of the neighboring nodes have been compromised. Accordingly, based on this determination, the control unit of the NIC 2 can cause the notification unit to output notification of the determined anomalous event relating to the inability of the NIC 2 to establish communication with one or more other nodes in the geographic area.

In another exemplary embodiment, suppose that the threshold operating information relates to distribution automation switching event counting. For example, suppose that the threshold operating information is directed to a maximum threshold value of the number of switching events or commands that may be issued by an RTU installed at a distribution device of the distribution network. As described above, in a distribution automation system, various quantities such as voltage, current, switch status, temperature and oil level, for example, are recorded in the field at the distribution transformers or feeder by an RTU. In this example, the control unit of the NIC 2 monitors the number of switching events or commands that have been issued and checks against the measured voltage/phase changes. Chatter is caused when there is faulty equipment (such as an RTU) that is changing its values constantly and issuing switching commands without any real effect, and thus clogging the communication channel with inaccurate switches. The control unit of the NIC 2 determines that there is no resulting voltage/phase change in spite of the series of commands issued by the RTU. In this example, since the control unit of the NIC 2 measures the number of the switching events or commands that have been issued by the RTU and compares the measured number of switching events or commands with the actual number of switching events or commands based on the measured voltage/phase changes, the control unit of the NIC 2 can determine that the measured operation data from the RTU does not comport with the actual operation data measured by the control unit of the NIC 2. Accordingly, in this example, the control unit of the NIC 2 will determine that an anomalous event has occurred with respect to the operation of the RTU and cause the notification unit to output notification of the anomalous event that was determined to have occurred with respect to the RTU. Concerning the incorrect number of switching commands issued by the RTU, the control unit of the NIC 2 can flag the commands issued by the RTU as chatter, and suppress issuance of the commands from the RTU.

In exemplary embodiments described above, the control unit was described as incrementing a counter value each time a predetermined condition and/or event was determined to have occurred, and comparing the incremented counter value to a threshold value defined in the threshold operating information recorded in the memory unit 7 of the NIC 2. Alternatively, the control unit of the NIC 2 can initially set the counter value to the threshold value indicated in the threshold operating information, and decrement the counter each time the predetermined condition and/or event was determined to have occurred. In this alternative configuration, the control unit of the NIC 2 will determine that an anomalous event has occurred when the value of the counter reaches zero. Accordingly, exemplary embodiments of the present disclosure provide that the control unit of the NIC 2 is configured to adjust (e.g., increment, decrement) the value of the counter each time that the predetermined condition and/or event is determined to have occurred, and determine that an anomalous event has occurred when the threshold value indicated in the threshold operating information has been reached.

The foregoing examples of threshold operating information are intended to illustrate different types of operating parameters of nodes that can be monitored by the NIC 2 to detect whether an anomalous event has occurred with respect to utility meter 130 with which the NIC 2 is associated in the utility network 100. The present disclosure is not limited to the foregoing examples. The threshold operating information defined for any node to be monitored by a NIC 2 can be directed to any conceivable operating parameter of a node that is desired to be monitored by the NIC 2.

In exemplary embodiments described above, a utility meter 130 was described as constituting a node in the utility network 100 by being associated with a NIC 2. The present disclosure is not limited to this embodiment. For example, one or more of the components of the NIC 2 illustrated in FIG. 2 can be constituted in the utility meter 130, in addition to or as an alternative to a utility meter 130 having a NIC 2 associated with the utility meter 130. According to an exemplary embodiment, components of the control unit of the NIC 2 (e.g., the CPU 6, ASIC 5 and/or memory 7) can be constituted in a processing unit (e.g., computer processor) of the meter 130, and the above-described operating system and/or application programs of the NIC 2 can be installed in a non-volatile, computer-readable recording medium (memory unit) of the processing unit of the utility meter 130. For example, when the utility meter 130 is manufactured and/or commissioned at a particular premises, the above-described operating system and/or application programs of the NIC 2 can be installed in the memory unit of the utility meter 130. Similarly, the utility meter 130 can be configured to include a network interface such as the transceiver 9 illustrated in FIG. 2 to enable the utility meter 130 to constitute a node in the utility network 100 and communicate with other nodes (e.g., other utility meters 130, access point(s) 110, relay(s) 140, and/or the communication station 120 of the utility provider) in the utility network 100. Accordingly, as an alternative to being provided with a NIC 2, a utility meter 130 can be configured to include the components and operative functions of the NIC 2 in accordance with the above-described exemplary embodiments. Therefore, a utility meter 130 including the components and operative functions of the NIC 2 in accordance with any of the above-described exemplary embodiments can constitute a node in the utility network 100, since the utility meter 130 is enabled to communicate with other nodes in the utility network 100.

Figure 8:
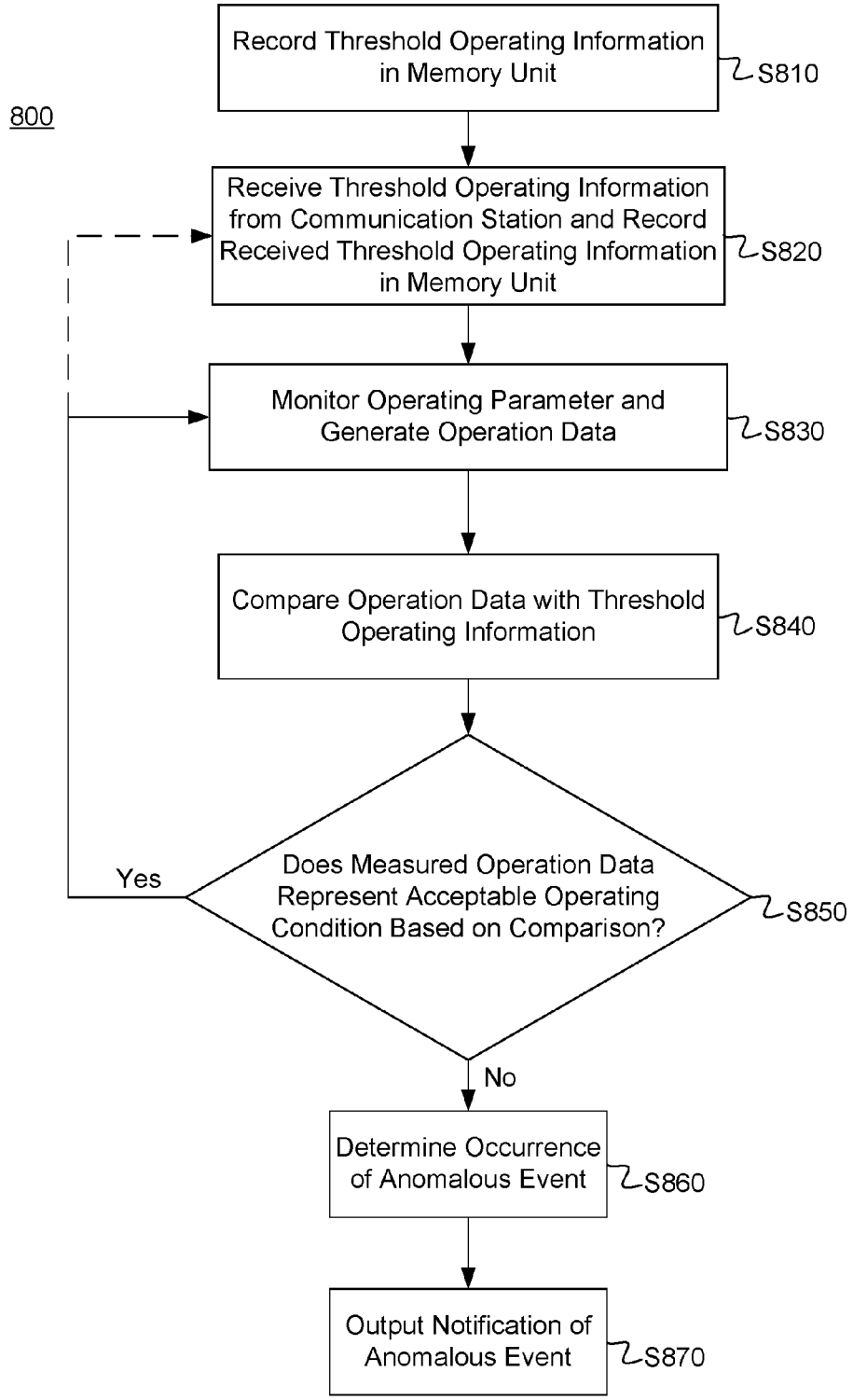
FIG. 8 is a flowchart diagram illustrating an exemplary method of operating a utility network interface device to detect whether anomalous events occur in connection with the utility network interface device and/or another node in a utility network.

FIG. 8 illustrates an exemplary method 800 of operating a NIC 2 to detect anomalous events occurring in connection with at least one node in the utility network 100. In this example, the NIC 2 is associated with a utility meter in the utility network 100 and constitutes a node in the utility network 100. In step S810, threshold operating information is recorded in the memory unit 7 of the NIC 2. It is to be understood that the exemplary method 800 illustrated in FIG. 8 is also applicable to a method of operating a utility meter 130 constituting the operative components and functions of a NIC 2 in accordance with the exemplary embodiments described above. The threshold operating information includes data indicative of configured acceptable operating parameters of the node in the utility network 100.

In optional step S820, threshold operating information can be received from at least one node in the utility network 100. For example, the threshold operating information can be received from the communication station 120 of the utility provider via one or more intermediary nodes, such an access point 110, another utility meter 130 and/or a relay 140. The received threshold operating information includes configured operation data expected to occur in the NIC 2. The received threshold operating information is recorded in the memory unit 7 of the NIC 2 in step S820. In addition to or as an alternative to receiving the threshold operating information, the threshold operating information can be predefined in the memory unit 7 of the NIC 2. If the threshold operating information is received and recorded and/or predefined in the memory unit 7, the NIC 2 can receive updated and/or new threshold operating information from at least one node in the utility network 100, and appropriately record the updated and/or new threshold operating information in the memory unit 7.

In step S830, the control unit of the NIC 2 monitors (e.g., measures, determines a counter value, etc.) operation data from at least one of the NIC 2 and the associated utility meter 130. In step S840, the control unit of the NIC 2 compares the measured operation data with the threshold operating information recorded in the memory unit 7.

In step S850, the control unit of the NIC 2 determines whether the measured operation data constitutes an anomalous event based on the comparison of the measured operation data with the threshold operating information in step S840. For instance, in step S850, the control unit of the NIC 2 determines whether the measured operation data represents an acceptable operating condition for the associated meter and/or the NIC 2, based on the comparison in step S840.

If the control unit of the NIC 2 determines that an anomalous event has occurred with respect to the NIC 2 and/or the associated meter, then, in step S870, the control unit of the NIC 2 causes the notification unit of the NIC 2 to output, external to the associated meter, notification of the determined anomalous event.

On the other hand, if the control unit of the NIC 2 does not determine that an anomalous event has occurred in step S850, the method returns to step S830 in which the control unit of the NIC 2 measures new operation data from the associated meter and/or the NIC 2. Alternatively, as illustrated by the dotted lines in FIG. 8, the control unit of the NIC 2 can return to step S820 to wait for reception of new threshold operation information to be received from another node in the utility network 100.

In the exemplary method illustrated in FIG. 8, steps S840 and S850 can include any of the comparison and determination operations defined with respect to the exemplary embodiments illustrated in FIGS. 4 and 5A-5C. In addition, the exemplary method illustrated in FIG. 8 can include any of the features of the above-described exemplary embodiments.

Furthermore, another exemplary embodiment of the present disclosure provides a computer-readable recording medium on which a computer program is recorded that causes the control unit of the NIC 2 to detect anomalous events occurring in connection with the NIC 2. With reference to the exemplary embodiment illustrated in FIG. 2, the memory unit 7 and/or ROM comprised in the CPU 6 can constitute a computer-readable recording medium on which an operating system and/or application programs of the NIC 2 can be recorded and executed by the control unit (e.g., CPU 6) of the NIC 2. The control unit of the NIC 2 is configured to communicate with any of these computer-readable recording media and thus is communicatively connected to these computer-readable media. The program recorded on the computer-readable recording medium can cause the control unit of the NIC 2 to perform any of the operations of the exemplary embodiments described above.

XII. Exemplary Operations of Access Point

As described above, nodes in the utility network 100 can transmit communications to an access point 110 to be forwarded to the communication station 120 of the utility provider. An access point 110 can be configured similarly to the constituent elements of the NIC 2 illustrated in FIG. 2, and/or the constituent elements of the communication station 120 as illustrated in FIG. 3. For example, an access point can include a memory unit similar to the NIC 2 and/or communication station 120, as well as control unit similar to the NIC 2 and/or communication station 120. The access point 110 also includes a network interface such as a transceiver to communicate via wired and/or wireless transmission mediums with the communication station 120 and the nodes downstream from the access point 110.

Similar to the functions of the communication station 120 and other nodes having an associated NIC 2, an access point 110 can also be configured to determine the occurrence of an anomalous event with respect to one or more other nodes in the utility network 100.

For example, when a node downstream of the access point 110 intends to utilize an access point 110 as an interface between the node and the communication station 120, the node registers with the access point 110. The access point 110 maintains a routing table in which each downstream node registered with the access point 110 is represented. The access point 110 continuously updates its routing table based on information it receives from the nodes registered in its routing table. The access point 110 can be configured to detect an anomalous event with respect to one or more downstream nodes if, for example, the routing table for the downstream node(s) changes at a rate exceeding a rate defined in threshold operating information recorded in the memory unit of the access point 110. In addition, the access point 110 can be configured to detect an anomalous with respect to one or more downstream nodes if the access point 110 receives a number of registration and/or un-registration messages from a downstream node that exceeds a threshold value defined in threshold operating information recorded in the memory unit of the access point 110. Similar to the above-described functions of a NIC 2, the access point 110 compares information it receives from downstream nodes and can generate operation data representing the received information. The access point 110 can compare the generated operation data with threshold operation information defined and recorded in the memory unit of the access point 110. If the generated operation data is indicative of an anomalous event based on the comparison of the operation data with the threshold operating information recorded in the memory unit of the access point 110, the access point 110 can be configured to generate an appropriate notification signal and transmit the notification signal to the communication station 120 to advise the communication station 120 of the detected anomalous event.

According to an exemplary embodiment, the access point 110 can also be configured to determine the occurrence of an anomalous event based on the order of registration messages received from a downstream node. For example, the access point 110 can have threshold operating information recorded in its memory unit that specifies a predetermined order of registration messages that are supposed to be received from a downstream node when the downstream node attempts to register with the access point 110. For example, if a downstream node transmits a registration message to the access point 110 to register with the communication station 120, but the downstream node has not previously registered with the access point 110, the access point 110 can determine that an anomalous event has occurred with respect to the registration procedure utilized by the downstream node. As another example, the access point 110 can have threshold operating information defined and recorded in its memory unit that defines a threshold value of the number of downstream nodes that are expected to register with the access point 110 in a particular period of time. If the access point 110 receives a number of registration requests from downstream nodes greater than or equal to this threshold value, the control unit of the access point 110 can determine the occurrence of an anomalous event with respect to the downstream nodes, or possibly the occurrence of an anomalous event with respect to another access point in the utility network 100. For example, if the threshold operating information recorded in the memory unit of the access point indicates a threshold value of one hundred new registrations from downstream nodes in a month, and the access point 110 receives one thousand new registrations from downstream nodes in a week, the reception of the new registration messages can be indicative of the failure of another access point 110 in the utility network 100.

Upon determining the occurrence of an anomalous event with respect to one or more nodes in the utility network 100, the access point 110 can also be configured to transmit the notification signal to the communication station 120 along with diagnostic information indicating the anomalous nature of the anomalous event. For example, the access point 110 can transmit diagnostic information indicating that the anomalous event was detected at the access point 110, that the access point 110 has confirmed the detection of the anomalous event based on its comparison of the information received from the downstream nodes with the threshold operating information defined and recorded in the access point 110, and/or that the diagnostic information transmitted from the access point 110 characterizes the type of anomalous event detected.

The threshold operating information defined and recorded in the memory unit of the access point 110 can include any of the aforementioned types of threshold operating information discussed above with respect to the communication station 120 and/or NIC 2. Similarly, the access point 110 can be configured to detect the occurrence of an anomalous event on a sliding time window, as described above with respect to the functions of a NIC 2.

In addition to the features of determining whether an anomalous event has occurred with respect to one or more nodes in the utility network 100 with which an access point 110 can communicate on the basis of threshold operating information recorded in the memory unit of the access point 110, the access point 110 can also determine whether an anomalous event has occurred with respect to one or more nodes in the utility network 100 by comparing operation data received from one or more nodes with (i) the threshold operating information defined for the nodes from which the operation data was received, and (ii) situational information recorded in the memory unit of the access point, similar to the exemplary features of the above-described communication station 120 of the utility provider. For example, the access point 110 can receive situational information including data indicative of configured operation data that is expected to be received from nodes in the utility network 100 during a predetermined period of time based on a condition and/or event that is occurring during the predetermined period of time. The situational information that an access point 110 can receive and/or have stored in its memory unit can correspond to any of the above-described examples of situational information defined and recorded in the memory unit 314 of the communication station 120.

Exemplary embodiments of a communication station 120, an access point 110 and a utility meter 130 have been described to illustrate how these nodes in the utility network 100 can detect the occurrence of an anomalous event with respect to one or more nodes in the utility network 100. It is to be understood that the structural components and operative functions of the various nodes in the utility network 100 for detecting the occurrence of an anomalous event can be implemented in any of the various nodes in the utility network 100 in accordance with the exemplary embodiments described above. For example, the above-described exemplary features of the communication station 120 for detecting an anomalous event with respect to downstream nodes can be implemented in an access point 110 and/or a utility meter 130 if such nodes possess appropriate processing components.

Combinations of the above-described exemplary embodiments, and other embodiments not specifically described herein will be apparent to those skilled in the art upon reviewing the above description. The scope of the various exemplary embodiments includes various other applications in which the above systems, structures, programs and methods are used.

It will be appreciated by those skilled in the art that the exemplary embodiments of the present disclosure can be embodied in other specific forms without departing from the spirit or essential character thereof. The presently disclosed embodiments are considered in all respects to be illustrative and not restrictive. The scope of the invention is indicated by the appended claims rather than the foregoing description, and all changes that come within the meaning and range of equivalents thereof are indicated to be embraced therein.

What is claimed is:

1. A network communication device configured to monitor operating events occurring in a network, the communication device comprising:
    a memory unit having historical operating information and situational information recorded therein, the historical operating information including data indicative of historical operation of nodes in the network based on respective locational information of each of the nodes in the network, the locational information of each one of the nodes respectively including unique information about that node, relative to each other one of the nodes in the network, such that there is historical operating information for each node in the network based on the unique locational information for that node, and the situational information including data indicative of operation data expected to be received from nodes in the network during a predetermined time period based on at least one of a condition and an event that is occurring during the predetermined time period;
    a communication unit configured to receive respective operation data from nodes in the network;
    a control unit configured to compare the operation data received from a node in the network with (i) the historical operating information for the node from which the operation data was received and (ii) the situational information, and to associate the received operation data with the historical operating information and the situational information in the memory unit based on the comparison of the received operation data with (i) the historical operating information for the node and (ii) the situational information.

2. The communication device according to claim 1, wherein the control unit is configured to determine whether the operation data received from a node exceeds historical patterns for the node from which the operation data is received, based on the comparison of the received operation data with (i) the historical operating information for the node from which the operation data was received and (ii) the situational information, and to record in the memory unit when the received operation data exceeds the historical patterns for the node.

3. The communication device according to claim 1, wherein the control unit is configured to update at least one of the historical operating information for the node and the situational information recorded in the memory unit, based on the comparison of the received operation data with (i) the historical operating information for the node and (ii) the situational information, when at least one of a) the received operation data deviates a predetermined amount from (i) the historical operating information for the node or (ii) the situational information, and b) operating conditions in the network have changed.

4. The communication device according to claim 1, wherein the historical operating information for a node in the network includes information defining historical operating patterns of the node to which the historical operating information pertains, and
wherein the control unit is configured to include operation data received from the node in the historical operating information for the node so that future operation data received from the node will be compared with the received operation data, and
wherein the historical operating information is recorded with version information indicating a version of the historical operating information.

5. The communication device according to claim 1, wherein the locational information of a node includes at least one of:
geographic information about a premises at which the node is located;
connection information indicating whether the node is currently connected to a distribution network to receive distribution of a commodity from the distribution network;
residential usage information of the premises at which the node is located;
attribute information of the premises at which the node is located;
premises comparison information indicating a comparative size of the premises at which the node is located relative to other premises at which other nodes in the network are located;
load usage information indicating at least one device serviceable at the node;
functional information indicating a functional use of the premises at which the node is located;
periodic usage patterns indicating a historical consumption of a commodity during a predetermined time period;
financial information indicating a current account status with a distribution network to which the node is connected to receive distribution of a commodity distributed by the distribution network; and
construction information indicating at least one of a construction date and a repair date of the premises at which the node is located.

6. The communication device according to claim 1, wherein the situational information defines operation data expected to be received during the predetermined time period based on at least one of an event-based, operational-based, seasonal-based and weather-based condition occurring at the predetermined time period.

7. The communication device according to claim 6, wherein the situational information includes an adjustment value for operational parameters of the historical operating information for a node based on the at least one of the event-based, operational-based, seasonal-based and weather-based condition occurring at the predetermined time period.

8. The communication device according to claim 1, wherein the at least one node is a utility network interface device associated with a utility meter.

9. The communication device according to claim 1, wherein the control unit is configured to:
compare the operation data received from a node with the historical operating information for the node from which the operation data was received;
determine whether the received operation data represents an acceptable operating condition based on the comparison of the received operation data with the historical operating information;
compare the received operation data with the situational information, if the control unit determines that the received operation data represents an acceptable operating condition based on the comparison of the received operation data with the historical operating information;
determine whether the received operation data represents operation data that is expected to be received based on the comparison of the received operation data with the situational information;
determine that the received operation data represents an anomalous event, if the control unit determines that the received operation data does not represent expected operation data based on the comparison of the received operation data with the historical operating information, the historical operating information for a node including acceptable operating parameters for the node based on the expected operation data for the node and whether any received operation data represented an anomalous event;
determine whether the acceptable operating parameters included in the historical operating information for the node are altered by the situational information, if the control unit determines that the received operation data does not represent an acceptable operating condition based on the comparison of the received operation data with the historical operating information;
determine that the received operation data represents an anomalous event, if the control unit determines that the acceptable operating parameters included in the historical operating information for the node are not altered by the situational information;
compare the received operation data with the situational information, if the control unit determines that the acceptable operating parameters included in the historical operating information for the node are altered by the situational information;
determine whether the received operation data represents operation data that is expected to be received based on the comparison of the received operation data with the situational information, if the control unit determines that the acceptable operating parameters included in the historical operating information for the node are altered by the situational information; and
determine that the received operation data represents an anomalous event, if the control unit determines that the received operation data does not represent expected operation data based on the comparison of the received operation data with the historical operating information, and if the control unit determines that the acceptable operating parameters included in the historical operating information for the node are altered by the situational information.

10. The communication device according to claim 9, wherein the control unit is configured to wait for new operation data to be received if the control unit does not determine that the compared operation data represents an anomalous event.

11. The communication device according to claim 1, wherein the control unit is configured to:
compare the received operation data with the situational information;
determine whether the received operation data represents operation data that is expected to be received based on the comparison of the received operation data with the situational information;
compare the received operation data with the historical operating information for the node, if the control unit determines that the received operation data represents expected operation data based on the comparison of the received operation data with the situational information;
determine whether the received operation data represents an acceptable operating parameter based on the comparison of the received operation data with the historical operating information;
determine that the received operation data represents an anomalous event, if the control unit does not determine that the received operation data represents an acceptable operating parameter based on the comparison of the received operation data with the historical operating information; and
determine that the received operation data represents an anomalous event, if the control unit determines that the received operation data does not represent expected operation data based on the comparison of the received operation data with the historical operating information.

12. The communication device according to claim 11, wherein the control unit is configured to wait for new operation data to be received if the control unit does not determine that the compared operation data represents an anomalous event.

13. The communication device according to claim 1, wherein the control unit is configured to:
compare the received operation data with the historical operating information for the node;
compare the received operation data with the situational information;
determine whether the received operation data represents an acceptable operating parameter based on the comparison of the received operation data with the historical operating information;
determine whether the received operation data represents operation data that is expected to be received based on the comparison of the received operation data with the situational information; and
determine that the received operation data represents an anomalous event, if the control unit determines that at least one of (i) the received operation data does not represent an acceptable operating parameter based on the comparison of the received operation data with the historical operating information, and (ii) the received operation data does not represent expected operation data based on the comparison of the received operation data with the situational information.

14. The communication device according to claim 13, wherein the control unit is configured to wait for new operation data to be received if the control unit does not determine that the compared operation data represents an anomalous event.

15. The communication device according to claim 14, wherein the notification unit is configured to output the notification of the anomalous event at the time the control unit determines that the anomalous event has occurred.

16. The communication device according to claim 1, wherein the communication device includes a user interface configured to receive a modification of at least one of the historical operating information and the situational information recorded in the memory unit.

17. The communication device according to claim 1, wherein the at least one node is selected from the group consisting of: a network interface device associated with a meter in a utility network, an access point in the utility network, a remote terminal unit equipped with a utility network interface device, a distribution device of a distribution network, and a terminal of a distribution automation system equipped with a utility network interface device.

18. A method of operating a network communication device to monitor operating events occurring in a network, the method comprising:
defining, in the communication device, historical operating information for nodes in the network, the historical operating information including data indicative of historical operation of nodes in the network based on respective locational information of each of the nodes in the network, the locational information of each one of the nodes respectively including unique information about that node, relative to each other one of the nodes in the network, such that there is historical operating information for each node in the network based on the unique locational information for that node;
defining, in the communication device, situational information for the nodes in the network, the situational information including data indicative of operation data expected to be received from nodes in the network during a predetermined time period based on at least one of a condition and an event that is occurring during the predetermined time period;
recording the defined historical operating information and situational information in a memory unit of the communication device;
receiving respective operation data from at least one node in the network;
comparing, in a processing unit of the communication device, the received operation data with (i) the historical operating information and (ii) the situational information which are respectively for the node from which the operation data was received; and
associating the received operation data with the recorded historical operating information and the situational information in the memory unit of the communication device, based on the comparison of the received operation data with (i) the historical operating information for the node from which the operation data was received and (ii) the situational information.

19. The method according to claim 18, comprising:
determining, in the processing unit of the communication device, whether the operation data received from a node exceeds historical patterns for the node from which the operation data is received, based on the comparison of the received operation data with (i) the historical operating information defined for the node from which the operation data was received and (ii) the situational information; and recording in the memory unit when the received operation data exceeds the historical patterns for the node.

20. The method according to claim 18, comprising:

updating, in the processing unit of the communication device, at least one of the historical operating information defined for the node from which the operation data was received and the situational information recorded in the memory unit, based on the comparison of the received operation data with (i) the historical operating information defined for the node from which the operation data was received and (ii) the situational information, when at least one of a) the received operation data deviates a predetermined amount from (i) the historical operating information defined for the node from which the operation data was received or (ii) the situational information, and b) operating conditions in the network have changed.

21. A non-transitory computer-readable recording medium having a computer program recorded thereon that causes a control unit of a network communication device communicatively connected to the computer-readable recording medium to monitor operating events occurring in a network, the program causing the control unit of the communication device to execute operations comprising:

defining historical operating information for nodes in the network, the historical operating information including data indicative of historical operation of nodes in the network based on respective locational information of each of the nodes in the network, the locational information of each one of the nodes respectively including unique information about that node, relative to each other one of the nodes in the network, such that there is historical operating information for each node in the network based on the unique locational information for that node;

defining situational information for the nodes in the network, the situational information including data indicative of operation data expected to be received from nodes in the network during a predetermined time period based on at least one of a condition and an event that is occurring during the predetermined time period;

recording the defined historical operating information and situational information in a memory unit of the communication device;

receiving respective operation data from at least one node in the network;

comparing the received operation data with (i) the historical operating information and (ii) the situational information which are respectively defined for the node from which the operation data was received; and associating the received operation data with the recorded historical operating information and the situational information in the memory unit of the communication device, based on the comparison of the received operation data with (i) the historical operating information defined for the node from which the operation data was received and (ii) the situational information.

22. The non-transitory computer-readable recording medium according to claim 21, wherein the program causes the control unit of the communication device to execute an operations comprising:

determining whether the operation data received from a node exceeds historical patterns for the node from which the operation data is received, based on the comparison of the received operation data with (i) the historical operating information defined for the node from which the operation data was received and (ii) the situational information; and recording when the received operation data exceeds the historical patterns for the node.

23. The non-transitory computer-readable recording medium according to claim 21, wherein the program causes the control unit of the communication device to execute an operation comprising:

updating the at least one of the historical operating information defined for the node from which the operation data was received and the situational information recorded in the memory unit, based on the comparison of the received operation data with (i) the historical operating information defined for the node from which the operation data was received and (ii) the situational information, when at least one of a) the received operation data deviates a predetermined amount from (i) the historical operating information defined for the node from which the operation data was received or (ii) the situational information, and b) operating conditions in the network have changed.

* * * * *